US012720097B2

(12) United States Patent
Hendry et al.

(10) Patent No.: US 12,720,097 B2
(45) Date of Patent: *Aug. 25, 2026

(54) HEADER PARAMETER SET FOR VIDEO CODING

(71) Applicant: Huawei Technologies Co., Ltd., Shenzhen (CN)

(72) Inventors: FNU Hendry, San Diego, CA (US); Ye-Kui Wang, San Diego, CA (US); Jianle Chen, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/962,729

(22) Filed: Nov. 27, 2024

(65) Prior Publication Data

US 2025/0220215 A1 Jul. 3, 2025

Related U.S. Application Data

(63) Continuation of application No. 17/246,026, filed on Apr. 30, 2021, now Pat. No. 12,184,878, which is a (Continued)

(51) Int. Cl.
*H04N 19/463* (2014.01)
*H04N 19/109* (2014.01)
(Continued)

(52) U.S. Cl.
CPC ......... *H04N 19/463* (2014.11); *H04N 19/109* (2014.11); *H04N 19/117* (2014.11); (Continued)

(58) Field of Classification Search
CPC .. H04N 19/109; H04N 19/117; H04N 19/174; H04N 19/186; H04N 19/187; H04N 19/31; H04N 19/463; H04N 19/70
See application file for complete search history.

(56) References Cited

U.S. PATENT DOCUMENTS

2009/0110073 A1 4/2009 Wu et al.
2012/0170649 A1 * 7/2012 Chen .................... H04N 19/129 375/240.18
(Continued)

FOREIGN PATENT DOCUMENTS

CN 103096054 A 5/2013
CN 104322071 A 1/2015
(Continued)

OTHER PUBLICATIONS

Tanaka et al. "Non-CE4 Subtest3 : Extension of Adaptation Parameter Sets syntax for Quantization matrix" Joint Collaborative Team on Video Coding (JCT-VC) of ITU-T SG16 WP3 and 1S0/IEC JTC1/SC29/WG11 7th Meeting: Geneva, CH, Nov. 21-30, 2011.*
(Continued)

*Primary Examiner* — Shahan Ur Rahaman
(74) *Attorney, Agent, or Firm* — Conley Rose, P.C.

(57) ABSTRACT

A video coding mechanism is disclosed. The mechanism includes receiving a bitstream comprising a first header parameter set (HPS) containing a first type of coding tool parameters, a second HPS containing a second type of coding tool parameters, a slice header, and a slice associated with the slice header. The mechanism further includes determining that the slice header contains a first reference to the first HPS and a second reference to the second HPS. The mechanism further includes decoding the slice using the first type of coding tool parameters and the second type of coding tool parameters based on the determination that the slice header contains the first reference and the second reference. The mechanism further includes forwarding the slice for display as part of a decoded video sequence.

18 Claims, 10 Drawing Sheets

Related U.S. Application Data continuation of application No. PCT/US2019/060113, filed on Nov. 6, 2019.

(60) Provisional application No. 62/756,983, filed on Nov. 7, 2018.

(51) Int. Cl.
*H04N 19/117* (2014.01)
*H04N 19/174* (2014.01)
*H04N 19/186* (2014.01)
*H04N 19/187* (2014.01)

(52) U.S. Cl.
CPC ......... *H04N 19/174* (2014.11); *H04N 19/186* (2014.11); *H04N 19/187* (2014.11)

(56) References Cited

U.S. PATENT DOCUMENTS

| | | | | |
|---|---|---|---|---|
| 2013/0188733 | A1 | 7/2013 | Van Der Auwera et al. | |
| 2013/0272372 | A1 | 10/2013 | Hannuksela et al. | |
| 2013/0272618 | A1* | 10/2013 | Deshpande | H04N 19/573 382/232 |
| 2013/0287115 | A1 | 10/2013 | Wang | |
| 2013/0343465 | A1* | 12/2013 | Chen | H04N 19/70 375/240.24 |
| 2014/0003491 | A1 | 1/2014 | Chen et al. | |
| 2015/0237352 | A1 | 8/2015 | Horowitz | |
| 2018/0124400 | A1* | 5/2018 | He | H04N 19/117 |
| 2021/0092380 | A1 | 3/2021 | Wang et al. | |
| 2022/0394301 | A1* | 12/2022 | Deshpande | H04N 19/172 |

FOREIGN PATENT DOCUMENTS

| | | | |
|---|---|---|---|
| CN | 107105295 | A | 8/2017 |
| JP | 2015518683 | A | 7/2015 |
| WO | 2013109505 | A2 | 7/2013 |
| WO | 2015101716 | A1 | 7/2015 |

OTHER PUBLICATIONS

"Line Transmission of Non-Telephone Signals; Video Codec for Audiovisual Services at px64 kbits," ITU-T Recommendation H.261, Mar. 1993, 29 pages.

"Transmission of Non-Telephone Signals; Information Technology—Generic Coding of Moving Pictures and Associated Ausio Information: Video," ITU-T Recommendation H.262, Jul. 1995, 211 pages.

"Series H: Audiovisual and Multimedia Systems; Infrastructure of audiovisual services—Coding of moving video; Video coding for low bit rate communication," ITU-T Recommendation H.263, Jan. 2005, 226 pages.

"Series H: Audiovisual and Multimedia Systems; Infrastructure of audiovisual services—Coding of moving video; Advanced video coding for generic audiovisual services," Recommendation ITU-T H.264, Jun. 2019, 836 pages.

"Series H: Audiovisual and Multimedia Systems; Infrastructure of audiovisual services • Coding of moving video; High efficiency video coding," Recommendation ITU-T H.265, Apr. 2013, 317 pages.

"Information Technology—Coding of audio-visual objects—Part 12: ISO base media file format," SO/IEC 14496-12, Fifth Edition, Dec. 15, 2015, 248 pages.

"Information Technology—Coding of audio-visual objects—Part 14: MP4 file format," ISO/IEC 14496-14, Second Edition, Nov. 2018, 22 pages.

"Information Technology—Coding of audio-visual objects—Part 15: Advanced Video Coding (AVC) file format," ISO/IE 14496-15, First Edition, Apr. 15, 2004, 29 pages.

"3rd Generation Partnership Project; Technical Specification Group Services and System Aspects; Transparent end-to-end packet switched streaming service (PSS); 3GPP file format (3GP); (Release 16)," 3GPP TS 26.244, V16.1.0, Sep. 2020, 68 pages.

Wenger, S., et al., "Slice Parameter Set," Joint Collaborative Team on Video Coding (JCT-VC) of ITU-T SG16 WP3 and ISO/IEC JTC1/SC29/WG11, 5th Meeting: Geneva, CH, Document: JCTVC-E281, Mar. 16-23, 2011, 4 pages.

Wenger, S., et al., "Adaptation Parameter Set (APS)," Joint Collaborative Team on Video Coding (JCT-VC) of ITU-T SG16 WP3 and ISO/IEC JTC1/SC29/WG11, 6th meeting: Torino, IT, Document: JCTVC-F747, Jul. 14-22, 2011, 12 pages.

Tsai, C., et al., "Non-CE8: Pure VLC for SAO and ALF," Joint Collaborative Team on Video Coding (JCT-VC) of ITU-T SG16 WP3 and ISO/IEC JTC1/SC29/WG11, 7th Meeting: Geneva, CH, Document: JCTVC-G220, Nov. 21-30, 2011, 5 pages.

Tanaka, J., "Non-CE4 Subtest3 : Extension of Adaptation Parameter Sets syntax for Quantization matrix," Joint Collaborative Team on Video Coding (JCT-VC) of ITU-T SG16 WP3 and ISO/IEC JTC1/SC29/WG11, 7th Meeting: Geneva, CH, Document: JCTVC-G295, Nov. 21-30, 2011, 7 pages.

Chen, Y., "Syntax elements in adaptation parameter set," Joint Collaborative Team on Video Coding (JCT-VC) of ITU-T SG16 WP3 and ISO/IEC JTC1/SC29/WG11, 7th Meeting: Geneva, CH, Document JCTVC-G330, Nov. 21-30, 2011, 5 pages.

Li, M., "Multiple Adaptation Parameter Sets Referring," Joint Collaborative Team on Video Coding (JCT-VC) of ITU-T SG16 WP3 and ISO/IEC JTC1/SC29/WG11, 7th Meeting: Geneva, CH, Document: JCTVC-G332, Nov. 21-30, 2011, 7 pages.

Esenlik, S., et al., "Syntax Refinements for SAO and ALF," Joint Collaborative Team on Video Coding (JCT-VC) of ITU-T SG16 WP3 and ISO/IEC JTC1/SC29/WG11, 7th Meeting: Geneva, CH, Document: JCTVC-G566, Nov. 21-30, 2011, 12 pages.

Chen, Y., et al., "Quantization matrices in fragmented APS," Joint Collaborative Team on Video Coding (JCT-VC) of ITU-T SG16 WP3 and ISO/IEC JTC1/SC29/WG11 7th Meeting: Geneva, CH, Document: JCTVC-G658, Nov. 21-30, 2011, 3 pages.

Wenger, S., "JCT-VC break-out report: Adaptation Parameter Set issues," Joint Collaborative Team on Video Coding (JCT-VC) of ITU-T SG16 WP3 and ISO/IEC JTC1/SC29/WG11 7th Meeting: Geneva, CH, Document: JCTVC-G1016r1, Nov. 21-30, 2011, 5 pages.

Li, M., et al., "Using Multiple APSs for Quantization Matrix Parameters Signaling," Joint Collaborative Team on Video Coding (JCT-VC) of ITU-T SG16 WP3 and ISO/IEC JTC1/SC29/WG11 7th Meeting: Geneva, CH, Document: JCTVC-G1026, Nov. 21-30, 2011, 6 pages.

Li, M., et al., "APS Referencing," Joint Collaborative Team on Video Coding (JCT-VC) of ITU-T SG16 WP3 and ISO/IEC JTC1/SC29/WG11 8th Meeting: San Jose, CA, USA, Document: JCTVC-H0069, Feb. 1-10, 2012, 10 pages.

Wenger, s., "APS partial update through conditional replacement," Joint Collaborative Team on Video Coding (JCT-VC) of ITU-T SG16 WP3 and ISO/IEC JTC1/SC29/WG11 8th Meeting: San José, CA, USA, Document: JCTVC-H0070, Feb. 1-10, 2012, 6 pages.

Minezawa, A., et al., "On partial updating of APS parameters," Joint Collaborative Team on Video Coding (JCT-VC) of ITU-T SG16 WP3 and ISO/IEC JTC1/SC29/WG11 8th Meeting: San Jose, CA, USA, Document: JCTVC-H0255_r3, Feb. 1-10, 2012, 12 pages.

Drugeon, V., et al., "AHG15: Partial APS update," Joint Collaborative Team on Video Coding (JCT-VC) of ITU-T SG16 WP3 and ISO/IEC JTC1/SC29/WG11 8th Meeting: San José, CA, USA, Document: JCTVC-H0381, Feb. 1-10, 2012, 5 pages.

Wang, Y., et al., "On APS partial update," Joint Collaborative Team on Video Coding (JCT-VC) of ITU-T SG16 WP3 and ISO/IEC JTC1/SC29/WG11 8th Meeting: San José, CA, USA, Feb. 1-10, 2012, 6 pages.

Wenger, s., et al., "Referencing different APS's in the same picture," Joint Collaborative Team on Video Coding (JCT-VC) of ITU-T SG16 WP3 and ISO/IEC JTC1/SC29/WG11 8th Meeting: San José, CA, USA, Document: JCTVC-H0507, Feb. 1-10, 2012, 2 pages.

Wenger, s., et al., "APS partial update through conditional replacement," Joint Collaborative Team on Video Coding (JCT-VC) of

(56) References Cited

OTHER PUBLICATIONS

ITU-T SG16 WP3 and ISO/IEC JTC1/SC29/WG11 9th Meeting: Geneva, CH, Document: JCTVC-10046, Apr. 27-May 7, 2012, 4 pages.

Li, M., et al., "Simplified APS Partial Update through Referencing," Joint Collaborative Team on Video Coding (JCT-VC) of ITU-T SG 16 WP 3 and ISO/IEC JTC 1/SC 29/WG 11 9th Meeting: Geneva, CH, Document: JCTVC-10061, Apr. 27-May 7, 2012, 7 pages.

Minezawa, A., et al., "On APS reference restriction for random access," Joint Collaborative Team on Video Coding (JCT-VC) of ITU-T SG 16 WP 3 and ISO/IEC JTC 1/SC 29/WG 11 9th Meeting: Geneva, CH, Document: JCTVC-10067, Apr. 27-May 7, 2012, 4 pages.

Hannuksela, M., et al., "APS error resilience and partial updating," Joint Collaborative Team on Video Coding (JCT-VC) of ITU-T SG 16 WP 3 and ISO/IEC JTC 1/SC 29/WG 11 9th Meeting: Geneva, CH, Document: JCTVC-10069, Apr. 27-May 7, 2012, 7 pages.

Hendry, et al., "APS partial update—APS update with one or multiple references," Joint Collaborative Team on Video Coding (JCT-VC) of ITU-T SG 16 WP 3 and ISO/IEC JTC 1/SC 29/WG 11 9th Meeting: Geneva, CH, Document: JCTVC-10081, Apr. 27-May 7, 2012, 10 pages.

Hendry, et al., "APS partial update—APS buffer management," Joint Collaborative Team on Video Coding (JCT-VC) of ITU-T SG 16 WP 3 and ISO/IEC JTC 1/SC 29/WG 11 9th Meeting: Geneva, CH, Document: JCTVC-10082, Apr. 27-May 7, 2012, 7 pages.

Hendry, et al., "Error resilience improvements for APS partial updates," Joint Collaborative Team on Video Coding (JCT-VC) of ITU-T SG 16 WP 3 and ISO/IEC JTC 1/SC 29/WG 11 9th Meeting: Geneva, CH, Document: JCTVC-10083, Apr. 27-May 7, 2012, 6 pages.

Ouedraogo, N., et al., "On APS referring and updating," Joint Collaborative Team on Video Coding (JCT-VC) of ITU-T SG 16 WP 3 and ISO/IEC JTC 1/SC 29/WG 11 9th Meeting: Geneva, CH, Document: JCTVC-10189, Apr. 27-May 7, 2012, 10 pages.

Tsai, C., et al., "AHG6/AHG9: Cleanups and fixes for APS," Joint Collaborative Team on Video Coding (JCT-VC) of ITU-T SG 16 WP 3 and ISO/IEC JTC 1/SC 29/WG 11 10th Meeting: Stockholm, SE, Document: JCTVC-J0047, Jul. 11-20, 2012, 6 pages.

Hannuksela, M., et al., "AHG9 High-Level Syntax: APS loss detection," Joint Collaborative Team on Video Coding (JCT-VC) of ITU-T SG 16 WP 3 and ISO/IEC JTC 1/SC 29/WG 11 10th Meeting: Stockholm, SE, Document: JCTVC-J0072, Jul. 11-20, 2012, 4 pages.

Chen, J., et al., "Algorithm description for Versatile Video Coding and Test Model 2 (VTM 2)," Joint Video Experts Team (JVET) of ITU-T SG 16 WP 3 and ISO/IEC JTC 1/SC 29/WG 11 11th Meeting: Ljubljana, SI, Document: JVET-K1002-v2, Jul. 10-18, 2018, 21 pages.

Hannuksela, M., et al., "Header parameter set (HPS)," Joint Video Experts Team (JVET) of ITU-T SG 16 WP 3 and ISO/IEC JTC 1/SC 29/WG 11 12th Meeting: Macao, CN, Document: JVET-L0183-v3, Oct. 3-12, 2018, 10 pages.

Bross, B., et al., "Versatile Video Coding (Draft 3)," Joint Video Experts Team (JVET) of ITU-T SG 16 WP 3 and ISO/IEC JTC 1/SC 29/WG 11 12th Meeting Macao, CN, Oct. 3-12, 2018, Document: JVET-L1001-v1, 169 pages.

Wang, Y., et al., "Coding of Parameter Sets," Joint Video Team (JVT) of ISO/IEC MPEG & ITU-T VCEG (ISO/IEC JTC1/SC29/WG11 and ITU-T SG16 Q.6) 3rd Meeting: Fairfax, Virginia, USA, Document: JVT-C078, May 6-10, 2022, 14 pages.

Y-K Wang, et al., "On APS partial update," Joint Collaborative Team on Video Coding (JCT-VC) of ITU-T SG16 WP3 and ISO/IEC JTC1/SC29/WG11, 8th Meeting: San Jose, CA, USA, Feb. 1-10, 2012, JCTVC-H0505r1, 5 pages.

Document: JCTVC-10600, Wang, Y.K. et al., "On semantics of temporal_id and related," Joint Collaborative Team on Video Coding (JCT-VC) of ITU-T SG 16 WP 3 and ISO/IEC JTC 1/SC 29/WG 11, 9th Meeting: Geneva, CH, Apr. 7, May 27, 2012, 4 pages.

Document: JCTVC-H0255_r3, Minezawa, A., et al., "On partial updating of APS parameters," Joint Collaborative Team on Video Coding (JCT-VC) of ITU-T SG16 WP3 and ISO/IEC JTC1/SC29/WG11, 8th Meeting: San Jose, CA, USA, Feb. 1-10, 2012, 12 pages.

Document: JCTVC-G1026, Li, M., et al., "Using Multiple APSs for Quantization Matrix Parameters Signaling," Joint Collaborative Team on Video Coding (JCT-VC) of ITU-T SG16 WP3 and ISO/IEC JTC1/SC29/WG11, 7th Meeting: Geneva, CH, Nov. 21-30, 2011, 6 pages.

Document: JVET-N0805-v1, Heng. B., et al., "AHG17: Design for signallilng reshaper model," Joint Video Experts Team (JVET) of ITU-T SG 16 WP 3 and ISO/IEC JTC 1/SC 29/WG 11, 14th Meeting: Geneva, CH, Mar. 19-27, 2019, 4 pages.

Benjamin Bross, et al. "Versatile Video Coding (Draft 7)", Document: JVET-P2001-v5,[online], Joint Video Experts Team (JVET) of ITU-T SG16 WP 3 and ISO/IEC JTC 1/SC 29/WG 11, JVET-P2001(version 5), Oct. 13, 2019, total 64 pages.

* cited by examiner

400

Decoder

Bitstream

Entropy Decoding

433

429

Inverse Transform & Quantization

421

Motion Compensation

417

Intra-Picture Prediction

423

Decoded Picture Buffer

In-loop Filters

425

Output Video Signal

HEADER PARAMETER SET FOR VIDEO CODING

CROSS-REFERENCE TO RELATED APPLICATIONS

This patent application is a continuation of U.S. patent application Ser. No. 17/246,026 filed Apr. 30, 2021 by FNU Hendry, et. al., and titled "Header Parameter Set For Video Coding," which is a continuation of International Application No. PCT/US2019/060113, filed Nov. 6, 2019 by FNU Hendry, et. al., and titled "Header Parameter Set For Video Coding," which claims the benefit of U.S. Provisional Patent Application No. 62/756,983, filed Nov. 7, 2018 by FNU Hendry, et. al., and titled "Header Parameter Set For Video Coding," which is hereby incorporated by reference.

TECHNICAL FIELD

The present disclosure is generally related to video coding, and is specifically related to efficient signaling of coding tool parameters used to compress video data in video coding.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

In an embodiment, the disclosure includes a method implemented in a decoder, the method comprising: receiving, by a receiver of the decoder, a bitstream comprising a first header parameter set (HPS) containing a first type of coding tool parameters, a second HPS containing a second type of coding tool parameters, a slice header, and a slice associated with the slice header; determining, by a processor of the decoder, that the slice header contains a first reference to the first HPS and a second reference to the second HPS; decoding, by the processor, the slice using the first type of coding tool parameters and the second type of coding tool parameters based on the determination that the slice header contains the first reference and the second reference; and forwarding, by the processor, the slice for display as part of a decoded video sequence. An HPS, also known as an adaptation parameter set (APS), may be employed to describe video data at lower granularity than a picture parameter set (PPS) and higher granularity than a slice header. The disclosed aspects allow a single slice header to refer to multiple types of HPS. By providing a mechanism to allow a single slice header to refer to multiple types of HPS, a variety of coding tool parameters can be signaled at the HPS level. This allows for coding tool parameters to change between slices in the same picture/frame without loading the slice headers with extra data. Accordingly, an encoder has greater flexibility when performing rate distortion optimization (RDO) as coding tool parameters that vary between slices in the same picture may not be loaded into every slice header. Further, average coding efficiency is increased as the encoder may have access to more encoding options when finding an optimal coding solution. This in turn reduces memory resource usage and network resources usage, at both the encoder and decoder, when storing the video data and when transmitting the video data.

Optionally, in any of the preceding aspects, another implementation of the aspect provides, wherein the first HPS and the second HPS include an adaptive loop filter (ALF) HPS, a luma mapping with chroma scaling (LMCS) HPS, a scaling list parameters HPS, or combinations thereof.

Optionally, in any of the preceding aspects, another implementation of the aspect provides, wherein the bitstream further comprises a plurality of HPS including the first HPS and the second HPS, and wherein each of the plurality of HPS is restricted from referencing coding tool parameters from other HPS in the plurality of HPS. In some systems, a current HPS may inherit coding parameters by reference to previous HPS. In theory, this allows a current HPS to only include the difference between the current HPS and a previous HPS. However, in practice, this approach often creates long inheritance chains, which in turn requires the decoder to maintain a large number of old HPS in the buffer as long as a subsequent HPS might refer back to the old HPS. This creates both buffer memory problems and increases the possibility of coding errors if an HPS is lost in transit. The aspects of the present disclosure address this issue by requiring that each HPS contain all relevant coding parameters without referencing other HPS.

Optionally, in any of the preceding aspects, another implementation of the aspect provides, wherein the first HPS is contained in an access unit associated with a temporal identifier (ID), and wherein the first HPS contains the temporal ID associated with the access unit that contains the first HPS. In one example, each HPS may be required to maintain the same temporal ID as the access unit that contains the HPS.

Optionally, in any of the preceding aspects, another implementation of the aspect provides, wherein the slice is part of a picture, wherein the picture is associated with a temporal ID, and wherein the first HPS contains the temporal ID associated with the picture. In some examples, each HPS may be required to maintain the same temporal ID as the picture associated with the first slice that refers to the HPS.

Optionally, in any of the preceding aspects, another implementation of the aspect provides, wherein the bitstream includes a plurality of pictures each containing one or more slices including the slice, wherein the bitstream further comprises a plurality of HPS including the first HPS and the second HPS, wherein each of the HPS and each of the slices are associated with one of a plurality of temporal IDs, and wherein each slice with a first temporal ID is restricted from referring to any HPS with a second temporal ID that is greater than the first temporal ID. In some examples, a bitstream of pictures and slices can be associated with one of a plurality of temporal IDs (e.g., one of three). The temporal IDs are each associated with a corresponding frame rate. Data items with higher frame rates may be ignored when lower frame rates are rendered. In the present example, a slice is prevented from referring to an HPS with a higher temporal ID and hence a higher frame rate. This approach ensures the slices do not refer to higher frame rate HPS, which are ignored when the lower frame rate of the slice is rendered. This may ensure the HPS is actually available to the slice and not ignored due to a frame rate mismatch.

In an embodiment, the disclosure includes a method implemented in an encoder, the method comprising: partitioning, by a processor of the encoder, a plurality of pictures into a plurality of slices; encoding, by the processor, the plurality of slices into a bitstream, wherein the slices are encoded by at least a first type of coding tools based on a first type of coding tool parameters and a second type of coding tools based on a second type of coding tool parameters; encoding, by the processor, a first HPS and a second HPS into the bitstream, the first HPS containing the first type of coding tool parameters and the second HPS containing the second type of coding tool parameters; encoding, by the processor, a first slice header into the bitstream describing an encoding of a first slice of the plurality of slices, wherein the first slice header contains a first reference to the first HPS and a second reference to the second HPS; and storing, by a memory coupled to the processor, the bitstream for communication toward a decoder. An HPS, also known as a APS, may be employed to describe video data at lower granularity than a PPS and higher granularity than a slice header. The disclosed aspects allow a single slice header to refer to multiple types of HPS. By providing a mechanism to allow a single slice header to refer to multiple types of HPS, a variety of coding tool parameters can be signaled at the HPS level. This allows for coding tool parameters to change between slices in the same picture/frame without loading the slice headers with extra data. Accordingly, an encoder has greater flexibility when performing RDO as coding tool parameters that vary between slices in the same picture may not be loaded into every slice header. Further, average coding efficiency is increased as the encoder may have access to more encoding options when finding an optimal coding solution. This in turn reduces memory resource usage and network resources usage, at both the encoder and decoder, when storing the video data and when transmitting the video data.

Optionally, in any of the preceding aspects, another implementation of the aspect provides, wherein the first HPS and the second HPS include an ALF HPS, a LMCS HPS, a scaling list parameters HPS, or combinations thereof.

Optionally, in any of the preceding aspects, another implementation of the aspect provides, further comprising encoding, by the processor, a plurality of HPS into the bitstream, wherein the plurality of HPS include the first HPS and the second HPS, and wherein each of the plurality of HPS is restricted from referencing coding tool parameters from other HPS in the plurality of HPS. In some systems, a current HPS may inherit coding parameters by reference to previous HPS. In theory, this allows a current HPS to only include the difference between the current HPS and a previous HPS. However, in practice, this approach often creates long inheritance chains, which in turn requires the decoder to maintain a large number of old HPS in the buffer as long as a subsequent HPS might refer back to the old HPS. This creates both buffer memory problems and increases the possibility of coding errors if an HPS is lost in transit. The aspects of the present disclosure address this issue by requiring that each HPS contain all relevant coding parameters without referencing other HPS.

Optionally, in any of the preceding aspects, another implementation of the aspect provides, wherein the first HPS is contained in an access unit associated with a temporal ID, and wherein the first HPS contains the temporal ID associated with the access unit that contains the first HPS. In one example, each HPS may be required to maintain the same temporal ID as the access unit that contains the HPS.

Optionally, in any of the preceding aspects, another implementation of the aspect provides, wherein the first slice is partitioned from a first picture, wherein the first picture is associated with a temporal ID, and wherein the first HPS contains the temporal ID associated with the picture. In some examples, each HPS may be required to maintain the same temporal ID as the picture associated with the first slice that refers to the HPS.

Optionally, in any of the preceding aspects, another implementation of the aspect provides, wherein a plurality of HPS are encoded including the first HPS and the second HPS, wherein each of the plurality of HPS and each of the slices are associated with one of a plurality of temporal IDs, and wherein each slice with a first temporal ID is restricted from referring to any HPS with a second temporal ID that is greater than the first temporal ID. In some examples, a bitstream of pictures and slices can be associated with one of a plurality of temporal IDs (e.g., one of three). The temporal IDs are each associated with a corresponding frame rate. Data items with higher frame rates may be ignored when lower frame rates are rendered. In the present example, a slice is prevented from referring to an HPS with a higher temporal ID and hence a higher frame rate. This approach ensures the slices do not refer to the higher frame rate HPS, which are ignored when the lower frame rate of the slice is rendered. This may ensure the HPS is actually available to the slice and not ignored due to a frame rate mismatch.

In an embodiment, the disclosure includes a video coding device comprising: a processor, a receiver coupled to the processor, a memory coupled to the processor and a transmitter coupled to the processor, wherein the processor, receiver, memory, and transmitter configured to perform the method of any of the preceding aspects.

In an embodiment, the disclosure includes a non-transitory computer readable medium comprising a computer program product for use by a video coding device, the computer program product comprising computer executable instructions stored on the non-transitory computer readable medium such that when executed by a processor cause the video coding device to perform the method of any of the preceding aspects.

In an embodiment, the disclosure includes a decoder comprising: a receiving means for receiving a bitstream comprising a first HPS containing a first type of coding tool parameters, a second HPS containing a second type of coding tool parameters, a slice header, and a slice associated with the slice header; a determining means for determining that the slice header contains a first reference to the first HPS and a second reference to the second HPS; a decoding means for decoding the slice using the first type of coding tool parameters and the second type of coding tool parameters based on the determination that the slice header contains the first reference and the second reference; and a forwarding means for forwarding the slice for display as part of a decoded video sequence.

Optionally, in any of the preceding aspects, another implementation of the aspect provides, wherein the decoder is further configured to perform the method of any of the preceding aspects.

In an embodiment, the disclosure includes an encoder comprising: a partitioning means for partitioning a plurality of pictures into a plurality of slices; an encoding means for: encoding, the plurality of slices into a bitstream, wherein the slices are encoded by at least a first type of coding tools based on a first type of coding tool parameters and a second type of coding tools based on a second type of coding tool parameters; encoding a first HPS and a second HPS into the bitstream, the first HPS containing the first type of coding tool parameters and the second HPS containing the second type of coding tool parameters; and encoding a first slice header into the bitstream describing an encoding of a first slice of the plurality of slices, wherein the first slice header contains a first reference to the first HPS and a second reference to the second HPS; and a storing means for storing the bitstream for communication toward a decoder.

Optionally, in any of the preceding aspects, another implementation of the aspect provides, wherein the encoder is further configured to perform the method of any of the preceding aspects.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
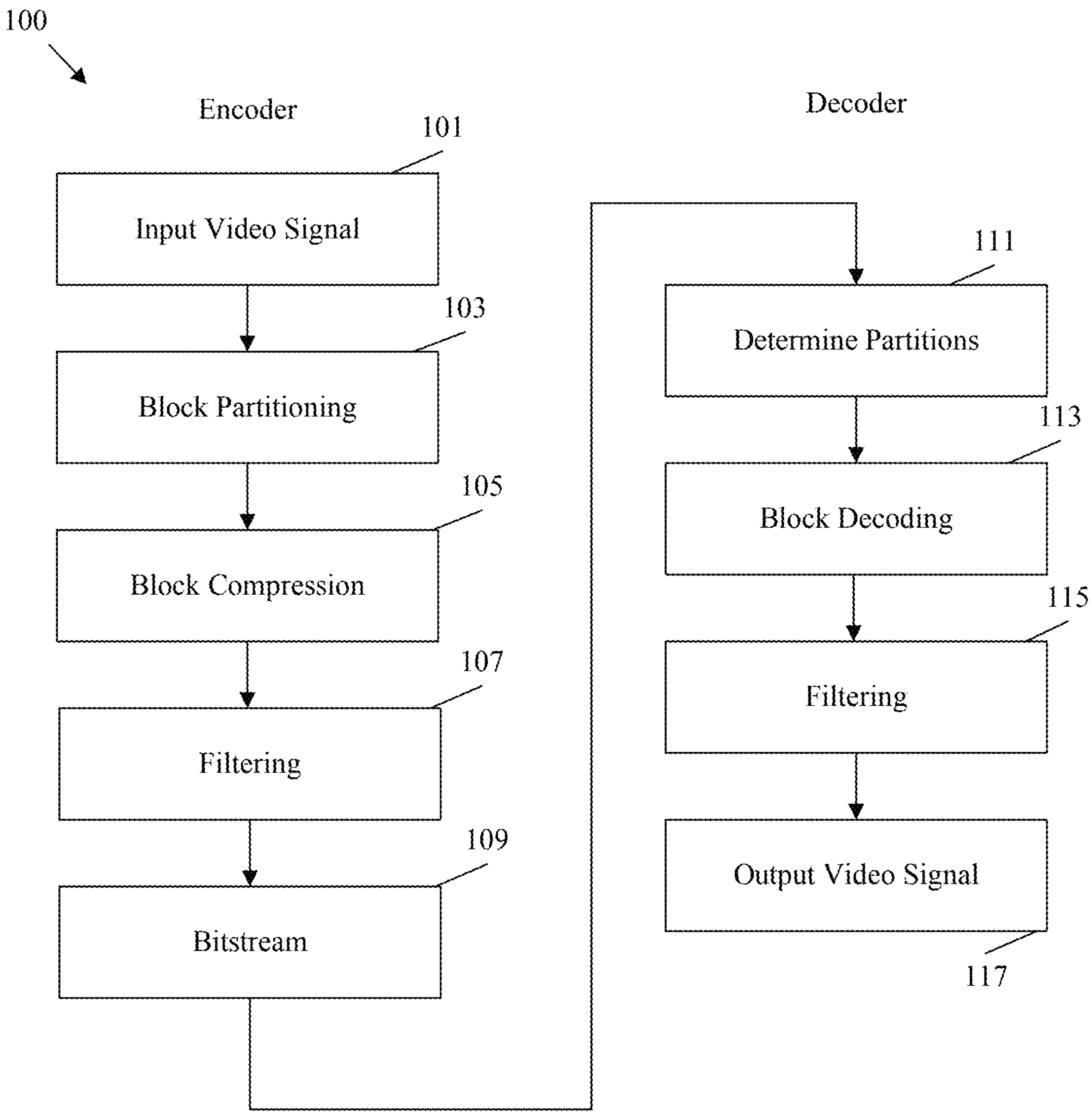
FIG. 1 is a flowchart of an example method of coding a video signal.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following acronyms are used herein, Adaptive Loop Filter (ALF), Coding Tree Block (CTB), Coding Tree Unit (CTU), Coding Unit (CU), Coded Video Sequence (CVS), Dynamic Adaptive Streaming over Hypertext transfer protocol (DASH), Joint Video Experts Team (JVET), Motion-Constrained Tile Set (MCTS), Maximum Transfer Unit (MTU), Network Abstraction Layer (NAL), Picture Order Count (POC), Raw Byte Sequence Payload (RBSP), Sample Adaptive Offset (SAO), Sequence Parameter Set (SPS), Versatile Video Coding (VVC), and Working Draft (WD).

Many video compression techniques can be employed to reduce the size of video files with minimal loss of data. For example, video compression techniques can include performing spatial (e.g., intra-picture) prediction and/or temporal (e.g., inter-picture) prediction to reduce or remove data redundancy in video sequences. For block-based video coding, a video slice (e.g., a video picture or a portion of a video picture) may be partitioned into video blocks, which may also be referred to as treeblocks, coding tree blocks (CTBs), coding tree units (CTUs), coding units (CUs), and/or coding nodes. Video blocks in an intra-coded (I) slice of a picture are coded using spatial prediction with respect to reference samples in neighboring blocks in the same picture. Video blocks in an inter-coded unidirectional prediction (P) or bidirectional prediction (B) slice of a picture may be coded by employing spatial prediction with respect to reference samples in neighboring blocks in the same picture or temporal prediction with respect to reference samples in other reference pictures. Pictures may be referred to as frames and/or images, and reference pictures may be referred to as reference frames and/or reference images. Spatial or temporal prediction results in a predictive block representing an image block. Residual data represents pixel differences between the original image block and the predictive block. Accordingly, an inter-coded block is encoded according to a motion vector that points to a block of reference samples forming the predictive block and the residual data indicating the difference between the coded block and the predictive block. An intra-coded block is encoded according to an intra-coding mode and the residual data. For further compression, the residual data may be transformed from the pixel domain to a transform domain. These result in residual transform coefficients, which may be quantized. The quantized transform coefficients may initially be arranged in a two-dimensional array. The quantized transform coefficients may be scanned in order to produce a one-dimensional vector of transform coefficients. Entropy coding may be applied to achieve even more compression. Such video compression techniques are discussed in greater detail below.

To ensure an encoded video can be accurately decoded, video is encoded and decoded according to corresponding video coding standards. Video coding standards include International Telecommunication Union (ITU) Standardization Sector (ITU-T) H.261, International Organization for Standardization/International Electrotechnical Commission (ISO/IEC) Motion Picture Experts Group (MPEG)-1 Part 2, ITU-T H.262 or ISO/IEC MPEG-2 Part 2, ITU-T H.263, ISO/IEC MPEG-4 Part 2, Advanced Video Coding (AVC), also known as ITU-T H.264 or ISO/IEC MPEG-4 Part 10, and High Efficiency Video Coding (HEVC), also known as ITU-T H.265 or MPEG-H Part 2. AVC includes extensions such as Scalable Video Coding (SVC), Multiview Video Coding (MVC) and Multiview Video Coding plus Depth (MVC+D), and three dimensional (3D) AVC (3D-AVC). HEVC includes extensions such as Scalable HEVC (SHVC), Multiview HEVC (MV-HEVC), and 3D HEVC (3D-HEVC). The joint video experts team (JVET) of ITU-T and ISO/IEC has begun developing a video coding standard referred to as Versatile Video Coding (VVC). VVC is included in a Working Draft (WD), which includes JVET-L1001-v1 and JVET-K1002-v3, which provides an algorithm description, an encoder-side description of the VVC WD, and reference software.

In order to code a video image, the image is first partitioned, and the partitions are coded into a bitstream. Various picture partitioning schemes are available. For example, an image can be partitioned into regular slices, dependent slices, tiles, and/or according to Wavefront Parallel Processing (WPP). For simplicity, HEVC restricts encoders so that only regular slices, dependent slices, tiles, WPP, and combinations thereof can be used when partitioning a slice into groups of CTBs for video coding. Such partitioning can be applied to support Maximum Transfer Unit (MTU) size matching, parallel processing, and reduced end-to-end delay. MTU denotes the maximum amount of data that can be transmitted in a single packet. If a packet payload is in excess of the MTU, that payload is split into two packets through a process called fragmentation.

A regular slice, also referred to simply as a slice, is a partitioned portion of an image that can be reconstructed independently from other regular slices within the same picture, notwithstanding some interdependencies due to loop filtering operations. Each regular slice is encapsulated in its own Network Abstraction Layer (NAL) unit for transmission. Further, in-picture prediction (intra sample prediction, motion information prediction, coding mode prediction) and entropy coding dependency across slice boundaries may be disabled to support independent reconstruction. Such independent reconstruction supports parallelization. For example, regular slice based parallelization employs minimal inter-processor or inter-core communication. However, as each regular slice is independent, each slice is associated with a separate slice header. The use of regular slices can incur a substantial coding overhead due to the bit cost of the slice header for each slice and due to the lack of prediction across the slice boundaries. Further, regular slices may be employed to support matching for MTU size requirements. Specifically, as a regular slice is encapsulated in a separate NAL unit and can be independently coded, each regular slice should be smaller than the MTU in MTU schemes to avoid breaking the slice into multiple packets. As such, the goal of parallelization and the goal of MTU size matching may place contradicting demands to a slice layout in a picture.

Dependent slices are similar to regular slices, but have shortened slice headers and allow partitioning of the image treeblock boundaries without breaking in-picture prediction. Accordingly, dependent slices allow a regular slice to be fragmented into multiple NAL units, which provides reduced end-to-end delay by allowing a part of a regular slice to be sent out before the encoding of the entire regular slice is complete.

A tile is a partitioned portion of an image created by horizontal and vertical boundaries that create columns and rows of tiles. Tiles may be coded in raster scan order (right to left and top to bottom). The scan order of CTBs is local within a tile. Accordingly, CTBs in a first tile are coded in raster scan order, before proceeding to the CTBs in the next tile. Similar to regular slices, tiles break in-picture prediction dependencies as well as entropy decoding dependencies. However, tiles may not be included into individual NAL units, and hence tiles may not be used for MTU size matching. Each tile can be processed by one processor/core, and the inter-processor/inter-core communication employed for in-picture prediction between processing units decoding neighboring tiles may be limited to conveying a shared slice header (when adjacent tiles are in the same slice), and performing loop filtering related sharing of reconstructed samples and metadata. When more than one tile is included in a slice, the entry point byte offset for each tile other than the first entry point offset in the slice may be signaled in the slice header. For each slice and tile, at least one of the following conditions should be fulfilled: 1) all coded treeblocks in a slice belong to the same tile; and 2) all coded treeblocks in a tile belong to the same slice.

In WPP, the image is partitioned into single rows of CTBs. Entropy decoding and prediction mechanisms may use data from CTBs in other rows. Parallel processing is made possible through parallel decoding of CTB rows. For example, a current row may be decoded in parallel with a preceding row. However, decoding of the current row is delayed from the decoding process of the preceding rows by two CTBs. This delay ensures that data related to the CTB above and the CTB above and to the right of the current CTB in the current row is available before the current CTB is coded. This approach appears as a wavefront when represented graphically. This staggered start allows for parallelization with up to as many processors/cores as the image contains CTB rows. Because in-picture prediction between neighboring treeblock rows within a picture is permitted, the inter-processor/inter-core communication to enable in-picture prediction can be substantial. The WPP partitioning does consider NAL unit sizes. Hence, WPP does not support MTU size matching. However, regular slices can be used in conjunction with WPP, with certain coding overhead, to implement MTU size matching as desired.

Tiles define horizontal and vertical boundaries that partition a picture into tile columns and rows. The scan order of CTBs may be changed to be local within a tile before decoding the top-left CTB of the next tile in the order of tile raster scan of a picture. A local scan order indicates the order of a CTB raster scan of a tile. Similar to regular slices, tiles may break in-picture prediction dependencies as well as entropy decoding dependencies. However, tiles may not be included in individual NAL units. Hence tiles may not be used for MTU size matching. Each tile can be processed by one processor/core. The inter-processor/inter-core communication used for in-picture prediction between processing units decoding neighboring tiles may be limited to conveying the shared slice header in cases where a slice spans more than one tile. The inter-processor/inter-core communication may also be used for loop filtering related sharing of reconstructed samples and metadata. When more than one tile or WPP segment is included in a slice, the entry point byte offset for each tile or WPP segment other than the first one in the slice may be signaled in the slice header. Restrictions on the application of the four different picture partitioning schemes may be employed to support simplicity. For example, a coded video sequence (CVS) may not include both tiles and wavefronts for most of the profiles specified in HEVC. For each slice and tile, either or both of the following conditions may also be fulfilled. All coded treeblocks in a slice may belong to the same tile, and all coded treeblocks in a tile may belong to the same slice. Further, a wavefront segment may contain exactly one CTB row. Also, when WPP is in use, a slice starting within a CTB row should end in the same CTB row.

VVC may include tile and tile group picture partitioning schemes. A tile in VVC may be the same as a tile in HEVC. VVC may employ tile groups in place of slices. A slice is defined as containing a group of CTUs, while a tile group is defined as containing a group of tiles. A coded picture may be made up of one or more slices (or tile groups). Each slice/tile group has a slice header that contains a syntax element representing information used for decoding the slice. Each slice header may contain information to decode only the slice. However, the information from a slice header is likely to be the same for other slices in the same picture. This is because coding tools may operate at a picture level, and hence the parameters for all the slices within a picture may be the same. This situation may result in redundant information in slice headers.

A header parameter set (HPS), also known as an APS, may be employed to overcome issues related to redundant slice header information. An HPS may contain slice level information that is shared by multiple slices. An HPS may be generated by an encoder and may contain coding tool parameters that are employed when decoding corresponding slices at a decoder. Some systems implement the HPS scheme by employing HPS and reference HPS. In this scheme, an initial HPS in coding order contains all of the relevant coding tool parameters for the corresponding slices. When such parameters change for a subsequent slice, a subsequent HPS includes only the parameters that have changed. The subsequent HPS then refers back to the initial HPS. Hence, the initial HPS acts as a reference HPS for the subsequent HPS. Further HPSs can then be employed to reference the previous HPSs, etc.

HPS referencing in this manner includes several problems. For example, allowing an HPS to refer to other HPS(s) results in a complex mechanism. As a particular example, this mechanism may result in a series of HPS references. In some cases, this approach may result in long chains of HPS, as there may be no explicit limit to the number of HPS references used in a bitstream containing video data. In order to manage such a scheme, the decoder may be required to maintain an arbitrary number to HPS in a decoded picture buffer in order to prepare for possible subsequent references. In order to address this issue, an HPS reset mechanism may be added to break any such extended HPS referencing chains, which adds further complexity. Further, this approach is potentially error prone. For example, if an early HPS is lost due to a transmission error, the subsequent referencing HPS would not contain sufficient data to decode the corresponding slides. Also, this approach may result in a large number of HPS in a bitstream. However, the number of HPS identifiers (ID) may be limited to avoid coding large HPS ID values. As such, HPS ID may be reused in the bitstream. This may result in ambiguity, for example when an HPS references an HPS ID used by more than one reference HPS. Further, HPS may be signaled within the coded bitstream, which is referred to as in-band signaling. HPS may also be signaled by external mechanisms, such as in metadata information. Such signaling is referred to as out-of-band signaling. Such dual signaling mechanisms further increase the complexity of the HPS scheme.

Disclosed herein are various mechanisms to reduce the complexity of HPS signaling. HPS is referred to as HPS in the most recent standards documentation. Accordingly, the following disclosure generally refers to HPS for clarity of discussion. However, the terms HPS and APS may be used interchangeably in most aspects. The present disclosure removes the complexity and error prone nature of HPS by preventing HPS from referencing other HPS. As HPS may not reference another HPS, the loss of a single HPS causes only localized errors. Further, the decoder may not be required to maintain HPS in memory as subsequent HPS replace previous HPS. As a specific example, multiple types of HPS may be employed where an HPS type indicates the type of coding tool parameters contained in the HPS. Such HPS types may include an adaptive loop filter (ALF) HPS, a luma mapping with chroma scaling (LMCS) HPS, and/or a scaling list parameters HPS. In such an example, when a current HPS of a first type is obtained by a decoder, previous HPS of the first type can be discarded as the current HPS replaces such previous HPS. Further, to allow for multiple types HPS, a single slice header may refer to more than one HPS to reference all the coding tool parameters for a corresponding slice. This is in contrast to other schemes that allow for a slice header to refer to a single HPS, which then refer to other HPS. Accordingly, allowing a single slice header to refer to multiple HPS results in an implementation that avoids HPS reference chains. Also, the present disclosure describes a mechanism that allows HPS to operate with temporal scaling. In temporal scaling, a bitstream is configured to allow a decoder and/or user to select from a plurality of frame rates. To implement such a scheme, pictures/frames are each assigned a temporal ID. Frames with lower temporal IDs are displayed at each frame rate. Frames with higher temporal IDs are skipped for lower frame rates and only displayed for higher frame rates. To support such temporal scaling, HPS are assigned a temporal ID. An HPS may receive the temporal ID of the picture that contains the first slice that refers the HPS. In other examples, the HPS may receive the temporal ID of the access unit that contains the HPS. An access unit is a bitstream data grouping that contains video data sufficient to decode a corresponding picture. To further support temporal scaling, slices associated with lower temporal IDs may be restricted from referring to HPS that contain greater temporal IDs. This ensures that lower frame rate settings do not cause a slice to refer to an HPS that is ignored due to temporal scaling, and hence prevents coding tool parameters from being unavailable when decoding certain slices at lower frame rates.

FIG. 1 is a flowchart of an example operating method 100 of coding a video signal. Specifically, a video signal is encoded at an encoder. The encoding process compresses the video signal by employing various mechanisms to reduce the video file size. A smaller file size allows the compressed video file to be transmitted toward a user, while reducing associated bandwidth overhead. The decoder then decodes the compressed video file to reconstruct the original video signal for display to an end user. The decoding process generally mirrors the encoding process to allow the decoder to consistently reconstruct the video signal.

At step 101, the video signal is input into the encoder. For example, the video signal may be an uncompressed video file stored in memory. As another example, the video file may be captured by a video capture device, such as a video camera, and encoded to support live streaming of the video. The video file may include both an audio component and a video component. The video component contains a series of image frames that, when viewed in a sequence, gives the visual impression of motion. The frames contain pixels that are expressed in terms of light, referred to herein as luma components (or luma samples), and color, which is referred to as chroma components (or color samples). In some examples, the frames may also contain depth values to support three dimensional viewing.

At step 103, the video is partitioned into blocks. Partitioning includes subdividing the pixels in each frame into square and/or rectangular blocks for compression. For example, in High Efficiency Video Coding (HEVC) (also known as H.265 and MPEG-H Part 2) the frame can first be divided into coding tree units (CTUs), which are blocks of a predefined size (e.g., sixty-four pixels by sixty-four pixels). The CTUs contain both luma and chroma samples. Coding trees may be employed to divide the CTUs into blocks and then recursively subdivide the blocks until configurations are achieved that support further encoding. For example, luma components of a frame may be subdivided until the individual blocks contain relatively homogenous lighting values. Further, chroma components of a frame may be subdivided until the individual blocks contain relatively homogenous color values. Accordingly, partitioning mechanisms vary depending on the content of the video frames.

At step 105, various compression mechanisms are employed to compress the image blocks partitioned at step 103. For example, inter-prediction and/or intra-prediction may be employed. Inter-prediction is designed to take advantage of the fact that objects in a common scene tend to appear in successive frames. Accordingly, a block depicting an object in a reference frame need not be repeatedly described in adjacent frames. Specifically, an object, such as a table, may remain in a constant position over multiple frames. Hence the table is described once and adjacent frames can refer back to the reference frame. Pattern matching mechanisms may be employed to match objects over multiple frames. Further, moving objects may be represented across multiple frames, for example due to object movement or camera movement. As a particular example, a video may show an automobile that moves across the screen over multiple frames. Motion vectors can be employed to describe such movement. A motion vector is a two-dimensional vector that provides an offset from the coordinates of an object in a frame to the coordinates of the object in a reference frame. As such, inter-prediction can encode an image block in a current frame as a set of motion vectors indicating an offset from a corresponding block in a reference frame.

Intra-prediction encodes blocks in a common frame. Intra-prediction takes advantage of the fact that luma and chroma components tend to cluster in a frame. For example, a patch of green in a portion of a tree tends to be positioned adjacent to similar patches of green. Intra-prediction employs multiple directional prediction modes (e.g., thirty-three in HEVC), a planar mode, and a direct current (DC) mode. The directional modes indicate that a current block is similar/the same as samples of a neighbor block in a corresponding direction. Planar mode indicates that a series of blocks along a row/column (e.g., a plane) can be interpolated based on neighbor blocks at the edges of the row. Planar mode, in effect, indicates a smooth transition of light/color across a row/column by employing a relatively constant slope in changing values. DC mode is employed for boundary smoothing and indicates that a block is similar/the same as an average value associated with samples of all the neighbor blocks associated with the angular directions of the directional prediction modes. Accordingly, intra-prediction blocks can represent image blocks as various relational prediction mode values instead of the actual values. Further, inter-prediction blocks can represent image blocks as motion vector values instead of the actual values. In either case, the prediction blocks may not exactly represent the image blocks in some cases. Any differences are stored in residual blocks. Transforms may be applied to the residual blocks to further compress the file.

At step 107, various filtering techniques may be applied. In HEVC, the filters are applied according to an in-loop filtering scheme. The block based prediction discussed above may result in the creation of blocky images at the decoder. Further, the block based prediction scheme may encode a block and then reconstruct the encoded block for later use as a reference block. The in-loop filtering scheme iteratively applies noise suppression filters, de-blocking filters, adaptive loop filters, and sample adaptive offset (SAO) filters to the blocks/frames. These filters mitigate such blocking artifacts so that the encoded file can be accurately reconstructed. Further, these filters mitigate artifacts in the reconstructed reference blocks so that artifacts are less likely to create additional artifacts in subsequent blocks that are encoded based on the reconstructed reference blocks.

Once the video signal has been partitioned, compressed, and filtered, the resulting data is encoded in a bitstream at step 109. The bitstream includes the data discussed above as well as any signaling data desired to support proper video signal reconstruction at the decoder. For example, such data may include partition data, prediction data, residual blocks, and various flags providing coding instructions to the decoder. The bitstream may be stored in memory for transmission toward a decoder upon request. The bitstream may also be broadcast and/or multicast toward a plurality of decoders. The creation of the bitstream is an iterative process. Accordingly, steps 101, 103, 105, 107, and 109 may occur continuously and/or simultaneously over many frames and blocks. The order shown in FIG. 1 is presented for clarity and ease of discussion, and is not intended to limit the video coding process to a particular order.

The decoder receives the bitstream and begins the decoding process at step 111. Specifically, the decoder employs an entropy decoding scheme to convert the bitstream into corresponding syntax and video data. The decoder employs the syntax data from the bitstream to determine the partitions for the frames at step 111. The partitioning should match the results of block partitioning at step 103. Entropy encoding/decoding as employed in step 111 is now described. The encoder makes many choices during the compression process, such as selecting block partitioning schemes from several possible choices based on the spatial positioning of values in the input image(s). Signaling the exact choices may employ a large number of bins. As used herein, a bin is a binary value that is treated as a variable (e.g., a bit value that may vary depending on context). Entropy coding allows the encoder to discard any options that are clearly not viable for a particular case, leaving a set of allowable options. Each allowable option is then assigned a code word. The length of the code words is based on the number of allowable options (e.g., one bin for two options, two bins for three to four options, etc.) The encoder then encodes the code word for the selected option. This scheme reduces the size of the code words as the code words are as big as desired to uniquely indicate a selection from a small sub-set of allowable options as opposed to uniquely indicating the selection from a potentially large set of all possible options. The decoder then decodes the selection by determining the set of allowable options in a similar manner to the encoder. By determining the set of allowable options, the decoder can read the code word and determine the selection made by the encoder.

At step 113, the decoder performs block decoding. Specifically, the decoder employs reverse transforms to generate residual blocks. Then the decoder employs the residual blocks and corresponding prediction blocks to reconstruct the image blocks according to the partitioning. The prediction blocks may include both intra-prediction blocks and inter-prediction blocks as generated at the encoder at step 105. The reconstructed image blocks are then positioned into frames of a reconstructed video signal according to the partitioning data determined at step 111. Syntax for step 113 may also be signaled in the bitstream via entropy coding as discussed above.

At step 115, filtering is performed on the frames of the reconstructed video signal in a manner similar to step 107 at the encoder. For example, noise suppression filters, de-blocking filters, adaptive loop filters, and SAO filters may be applied to the frames to remove blocking artifacts. Once the frames are filtered, the video signal can be output to a display at step 117 for viewing by an end user.

Figure 2:
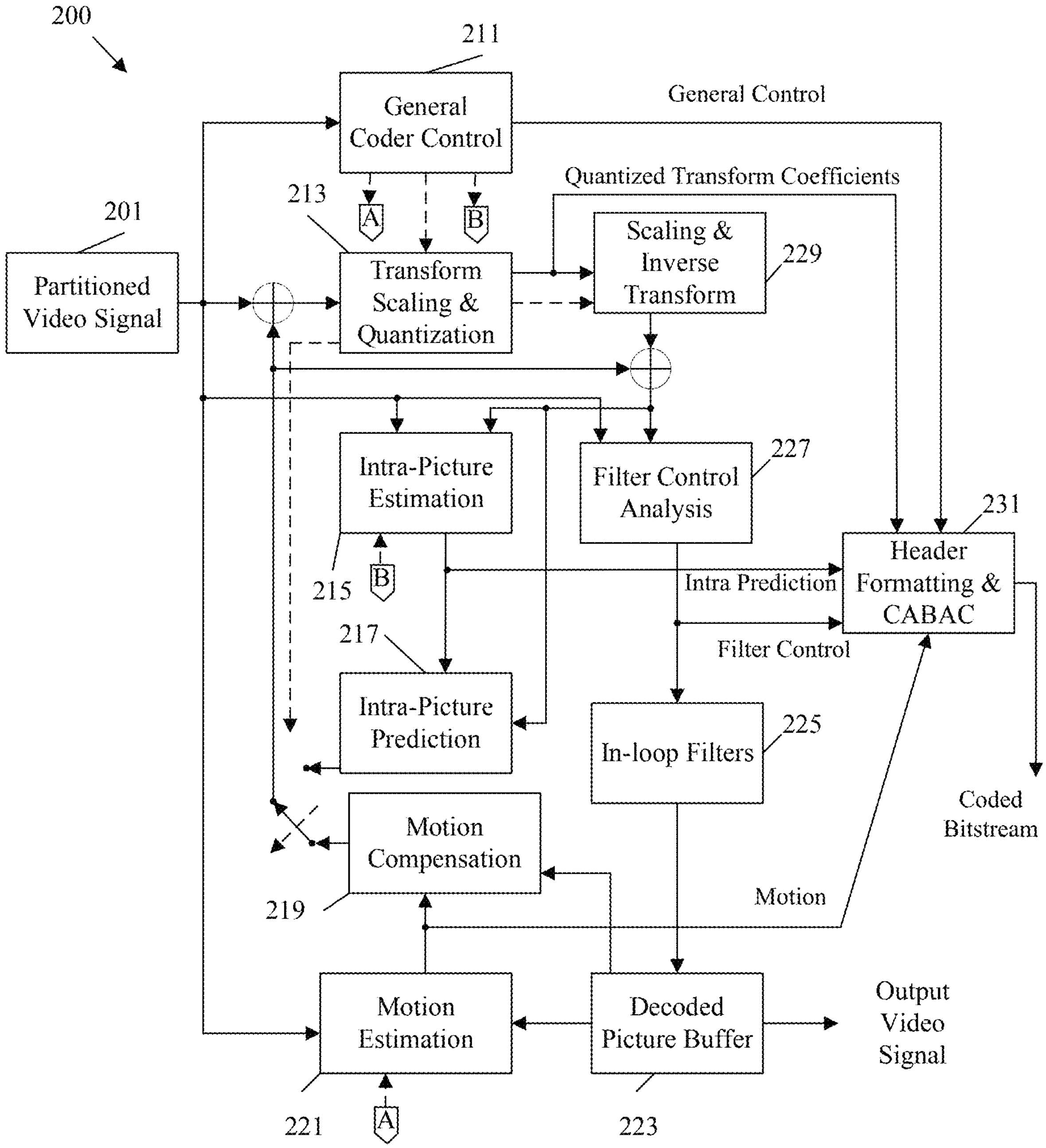
FIG. 2 is a schematic diagram of an example coding and decoding (codec) system for video coding.

FIG. 2 is a schematic diagram of an example coding and decoding (codec) system 200 for video coding. Specifically, codec system 200 provides functionality to support the implementation of operating method 100. Codec system 200 is generalized to depict components employed in both an encoder and a decoder. Codec system 200 receives and partitions a video signal as discussed with respect to steps 101 and 103 in operating method 100, which results in a partitioned video signal 201. Codec system 200 then compresses the partitioned video signal 201 into a coded bitstream when acting as an encoder as discussed with respect to steps 105, 107, and 109 in method 100. When acting as a decoder, codec system 200 generates an output video signal from the bitstream as discussed with respect to steps 111, 113, 115, and 117 in operating method 100. The codec system 200 includes a general coder control component 211, a transform scaling and quantization component 213, an intra-picture estimation component 215, an intra-picture prediction component 217, a motion compensation component 219, a motion estimation component 221, a scaling and inverse transform component 229, a filter control analysis component 227, an in-loop filters component 225, a decoded picture buffer component 223, and a header formatting and context adaptive binary arithmetic coding (CABAC) component 231. Such components are coupled as shown. In FIG. 2, black lines indicate movement of data to be encoded/decoded while dashed lines indicate movement of control data that controls the operation of other components. The components of codec system 200 may all be present in the encoder. The decoder may include a subset of the components of codec system 200. For example, the decoder may include the intra-picture prediction component 217, the motion compensation component 219, the scaling and inverse transform component 229, the in-loop filters component 225, and the decoded picture buffer component 223. These components are now described.

The partitioned video signal 201 is a captured video sequence that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks can be included in coding units (CUs) in some cases. For example, a CU can be a sub-portion of a CTU that contains a luma block, red difference chroma (Cr) block(s), and a blue difference chroma (Cb) block(s) along with corresponding syntax instructions for the CU. The split modes may include a binary tree (BT), triple tree (TT), and a quad tree (QT) employed to partition a node into two, three, or four child nodes, respectively, of varying shapes depending on the split modes employed. The partitioned video signal 201 is forwarded to the general coder control component 211, the transform scaling and quantization component 213, the intra-picture estimation component 215, the filter control analysis component 227, and the motion estimation component 221 for compression.

The general coder control component 211 is configured to make decisions related to coding of the images of the video sequence into the bitstream according to application constraints. For example, the general coder control component 211 manages optimization of bitrate/bitstream size versus reconstruction quality. Such decisions may be made based on storage space/bandwidth availability and image resolution requests. The general coder control component 211 also manages buffer utilization in light of transmission speed to mitigate buffer underrun and overrun issues. To manage these issues, the general coder control component 211 manages partitioning, prediction, and filtering by the other components. For example, the general coder control component 211 may dynamically increase compression complexity to increase resolution and increase bandwidth usage or decrease compression complexity to decrease resolution and bandwidth usage. Hence, the general coder control component 211 controls the other components of codec system 200 to balance video signal reconstruction quality with bit rate concerns. The general coder control component 211 creates control data, which controls the operation of the other components. The control data is also forwarded to the header formatting and CABAC component 231 to be encoded in the bitstream to signal parameters for decoding at the decoder.

The partitioned video signal 201 is also sent to the motion estimation component 221 and the motion compensation component 219 for inter-prediction. A frame or slice of the partitioned video signal 201 may be divided into multiple video blocks. Motion estimation component 221 and the motion compensation component 219 perform inter-predictive coding of the received video block relative to one or more blocks in one or more reference frames to provide temporal prediction. Codec system 200 may perform multiple coding passes, e.g., to select an appropriate coding mode for each block of video data.

Motion estimation component 221 and motion compensation component 219 may be highly integrated, but are illustrated separately for conceptual purposes. Motion estimation, performed by motion estimation component 221, is the process of generating motion vectors, which estimate motion for video blocks. A motion vector, for example, may indicate the displacement of a coded object relative to a predictive block. A predictive block is a block that is found to closely match the block to be coded, in terms of pixel difference. A predictive block may also be referred to as a reference block. Such pixel difference may be determined by sum of absolute difference (SAD), sum of square difference (SSD), or other difference metrics. HEVC employs several coded objects including a CTU, coding tree blocks (CTBs), and CUs. For example, a CTU can be divided into CTBs, which can then be divided into CBs for inclusion in CUs. A CU can be encoded as a prediction unit (PU) containing prediction data and/or a transform unit (TU) containing transformed residual data for the CU. The motion estimation component 221 generates motion vectors, PUs, and TUs by using a rate-distortion analysis as part of a rate distortion optimization process. For example, the motion estimation component 221 may determine multiple reference blocks, multiple motion vectors, etc. for a current block/frame, and may select the reference blocks, motion vectors, etc. having the best rate-distortion characteristics. The best rate-distortion characteristics balance both quality of video reconstruction (e.g., amount of data loss by compression) with coding efficiency (e.g., size of the final encoding).

In some examples, codec system 200 may calculate values for sub-integer pixel positions of reference pictures stored in decoded picture buffer component 223. For example, video codec system 200 may interpolate values of one-quarter pixel positions, one-eighth pixel positions, or other fractional pixel positions of the reference picture. Therefore, motion estimation component 221 may perform a motion search relative to the full pixel positions and fractional pixel positions and output a motion vector with fractional pixel precision. The motion estimation component 221 calculates a motion vector for a PU of a video block in an inter-coded slice by comparing the position of the PU to the position of a predictive block of a reference picture. Motion estimation component 221 outputs the calculated motion vector as motion data to header formatting and CABAC component 231 for encoding and motion to the motion compensation component 219.

Motion compensation, performed by motion compensation component 219, may involve fetching or generating the predictive block based on the motion vector determined by motion estimation component 221. Again, motion estimation component 221 and motion compensation component 219 may be functionally integrated, in some examples. Upon receiving the motion vector for the PU of the current video block, motion compensation component 219 may locate the predictive block to which the motion vector points. A residual video block is then formed by subtracting pixel values of the predictive block from the pixel values of the current video block being coded, forming pixel difference values. In general, motion estimation component 221 performs motion estimation relative to luma components, and motion compensation component 219 uses motion vectors calculated based on the luma components for both chroma components and luma components. The predictive block and residual block are forwarded to transform scaling and quantization component 213.

The partitioned video signal 201 is also sent to intra-picture estimation component 215 and intra-picture prediction component 217. As with motion estimation component 221 and motion compensation component 219, intra-picture estimation component 215 and intra-picture prediction component 217 may be highly integrated, but are illustrated separately for conceptual purposes. The intra-picture estimation component 215 and intra-picture prediction component 217 intra-predict a current block relative to blocks in a current frame, as an alternative to the inter-prediction performed by motion estimation component 221 and motion compensation component 219 between frames, as described above. In particular, the intra-picture estimation component 215 determines an intra-prediction mode to use to encode a current block. In some examples, intra-picture estimation component 215 selects an appropriate intra-prediction mode to encode a current block from multiple tested intra-prediction modes. The selected intra-prediction modes are then forwarded to the header formatting and CABAC component 231 for encoding.

For example, the intra-picture estimation component 215 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 215 calculates ratios from the distortions and rates for the various encoded blocks to determine which intra-prediction mode exhibits the best rate-distortion value for the block. In addition, intra-picture estimation component 215 may be configured to code depth blocks of a depth map using a depth modeling mode (DMM) based on rate-distortion optimization (RDO).

The intra-picture prediction component 217 may generate a residual block from the predictive block based on the selected intra-prediction modes determined by intra-picture estimation component 215 when implemented on an encoder or read the residual block from the bitstream when implemented on a decoder. The residual block includes the difference in values between the predictive block and the original block, represented as a matrix. The residual block is then forwarded to the transform scaling and quantization component 213. The intra-picture estimation component 215 and the intra-picture prediction component 217 may operate on both luma and chroma components.

The transform scaling and quantization component 213 is configured to further compress the residual block. The transform scaling and quantization component 213 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 213 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 213 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 213 may then perform a scan of the matrix including the quantized transform coefficients. The quantized transform coefficients are forwarded to the header formatting and CABAC component 231 to be encoded in the bitstream.

The scaling and inverse transform component 229 applies a reverse operation of the transform scaling and quantization component 213 to support motion estimation. The scaling and inverse transform component 229 applies inverse scaling, transformation, and/or quantization to reconstruct the residual block in the pixel domain, e.g., for later use as a reference block which may become a predictive block for another current block. The motion estimation component 221 and/or motion compensation component 219 may calculate a reference block by adding the residual block back to a corresponding predictive block for use in motion estimation of a later block/frame. Filters are applied to the reconstructed reference blocks to mitigate artifacts created during scaling, quantization, and transform. Such artifacts could otherwise cause inaccurate prediction (and create additional artifacts) when subsequent blocks are predicted.

The filter control analysis component 227 and the in-loop filters component 225 apply the filters to the residual blocks and/or to reconstructed image blocks. For example, the transformed residual block from the scaling and inverse transform component 229 may be combined with a corresponding prediction block from intra-picture prediction component 217 and/or motion compensation component 219 to reconstruct the original image block. The filters may then be applied to the reconstructed image block. In some examples, the filters may instead be applied to the residual blocks. As with other components in FIG. 2, the filter control analysis component 227 and the in-loop filters component 225 are highly integrated and may be implemented together, but are depicted separately for conceptual purposes. Filters applied to the reconstructed reference blocks are applied to particular spatial regions and include multiple parameters to adjust how such filters are applied. The filter control analysis component 227 analyzes the reconstructed reference blocks to determine where such filters should be applied and sets corresponding parameters. Such data is forwarded to the header formatting and CABAC component 231 as filter control data for encoding. The in-loop filters component 225 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer component 223 for later use in motion estimation as discussed above. When operating as a decoder, the decoded picture buffer component 223 stores and forwards the reconstructed and filtered blocks toward a display as part of an output video signal. The decoded picture buffer component 223 may be any memory device capable of storing prediction blocks, residual blocks, and/or reconstructed image blocks.

The header formatting and CABAC component 231 receives the data from the various components of codec system 200 and encodes such data into a coded bitstream for transmission toward a decoder. Specifically, the header formatting and CABAC component 231 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 201. Such information may also include intra-prediction mode index tables (also referred to as codeword mapping tables), definitions of encoding contexts for various blocks, indications of most probable intra-prediction modes, an indication of partition information, etc. Such data may be encoded by employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

Figure 3:
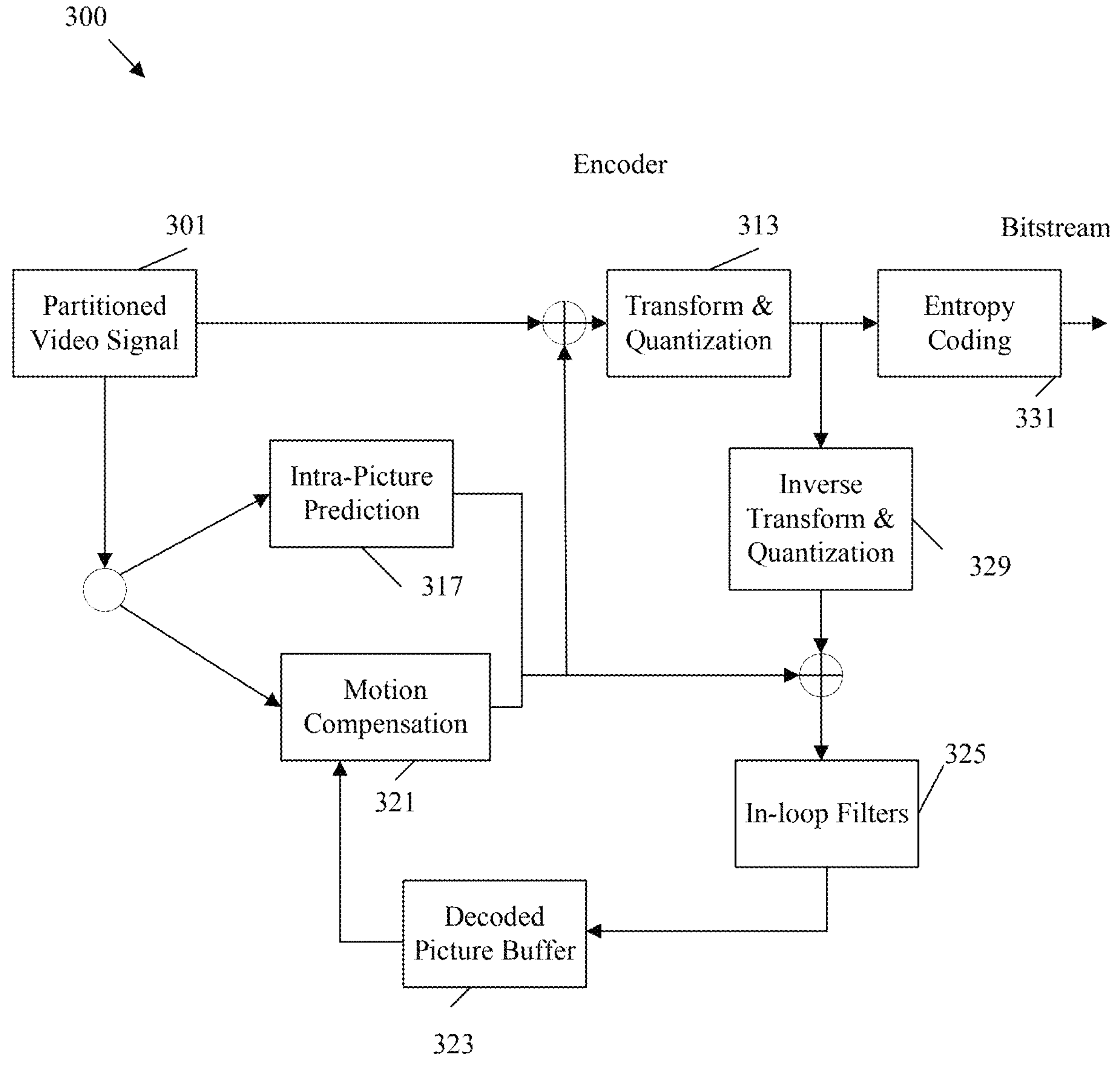
FIG. 3 is a schematic diagram illustrating an example video encoder.

FIG. 3 is a block diagram illustrating an example video encoder 300. Video encoder 300 may be employed to implement the encoding functions of codec system 200 and/or implement steps 101, 103, 105, 107, and/or 109 of operating method 100. Encoder 300 partitions an input video signal, resulting in a partitioned video signal 301, which is substantially similar to the partitioned video signal 201. The partitioned video signal 301 is then compressed and encoded into a bitstream by components of encoder 300.

Specifically, the partitioned video signal 301 is forwarded to an intra-picture prediction component 317 for intra-prediction. The intra-picture prediction component 317 may be substantially similar to intra-picture estimation component 215 and intra-picture prediction component 217. The partitioned video signal 301 is also forwarded to a motion compensation component 321 for inter-prediction based on reference blocks in a decoded picture buffer component 323. The motion compensation component 321 may be substantially similar to motion estimation component 221 and motion compensation component 219. The prediction blocks and residual blocks from the intra-picture prediction component 317 and the motion compensation component 321 are forwarded to a transform and quantization component 313 for transform and quantization of the residual blocks. The transform and quantization component 313 may be substantially similar to the transform scaling and quantization component 213. The transformed and quantized residual blocks and the corresponding prediction blocks (along with associated control data) are forwarded to an entropy coding component 331 for coding into a bitstream. The entropy coding component 331 may be substantially similar to the header formatting and CABAC component 231.

The transformed and quantized residual blocks and/or the corresponding prediction blocks are also forwarded from the transform and quantization component 313 to an inverse transform and quantization component 329 for reconstruction into reference blocks for use by the motion compensation component 321. The inverse transform and quantization component 329 may be substantially similar to the scaling and inverse transform component 229. In-loop filters in an in-loop filters component 325 are also applied to the residual blocks and/or reconstructed reference blocks, depending on the example. The in-loop filters component 325 may be substantially similar to the filter control analysis component 227 and the in-loop filters component 225. The in-loop filters component 325 may include multiple filters as discussed with respect to in-loop filters component 225. The filtered blocks are then stored in a decoded picture buffer component 323 for use as reference blocks by the motion compensation component 321. The decoded picture buffer component 323 may be substantially similar to the decoded picture buffer component 223.

Figure 4:
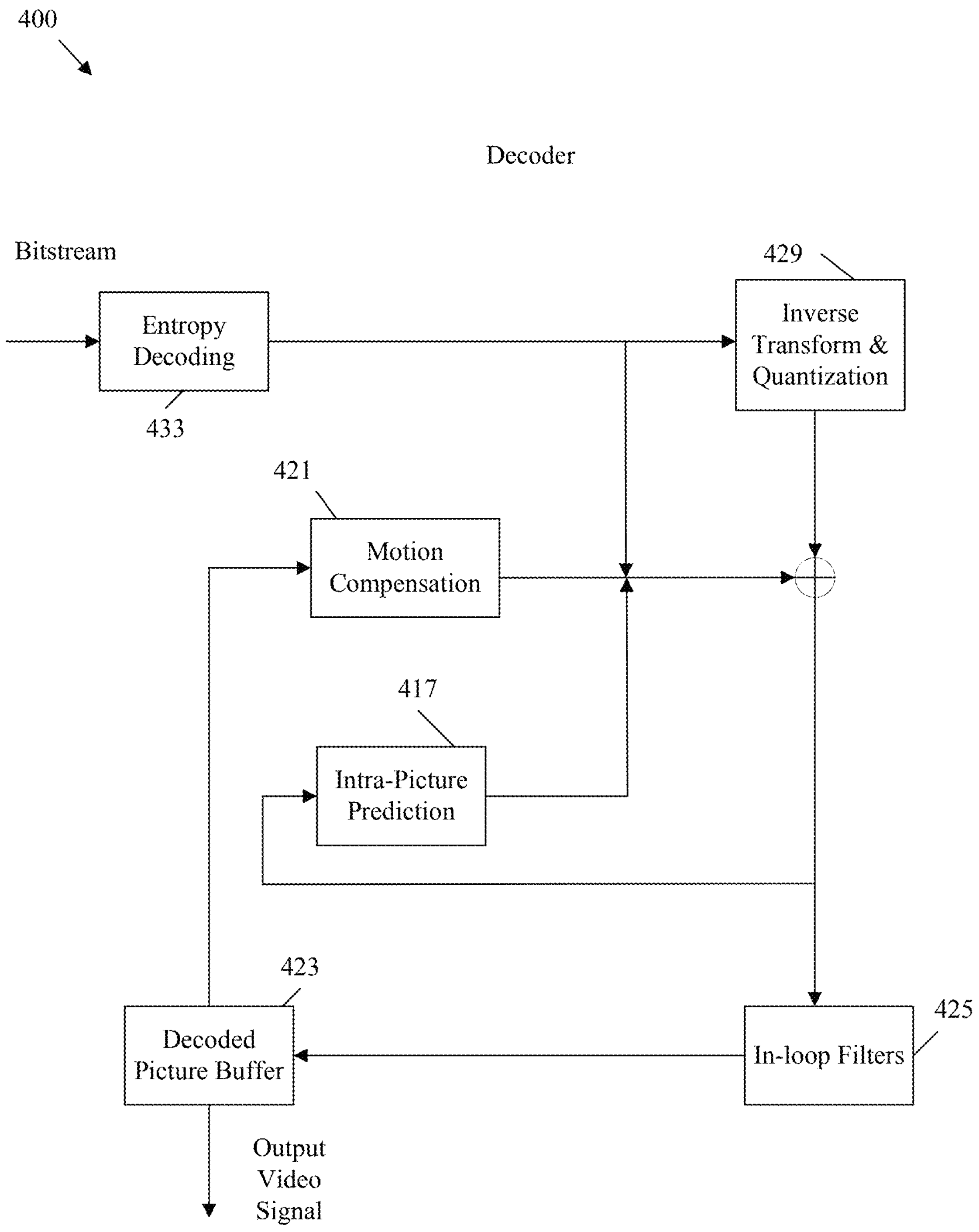
FIG. 4 is a schematic diagram illustrating an example video decoder.

FIG. 4 is a block diagram illustrating an example video decoder 400. Video decoder 400 may be employed to implement the decoding functions of codec system 200 and/or implement steps 111, 113, 115, and/or 117 of operating method 100. Decoder 400 receives a bitstream, for example from an encoder 300, and generates a reconstructed output video signal based on the bitstream for display to an end user.

The bitstream is received by an entropy decoding component 433. The entropy decoding component 433 is configured to implement an entropy decoding scheme, such as CAVLC, CABAC, SBAC, PIPE coding, or other entropy coding techniques. For example, the entropy decoding component 433 may employ header information to provide a context to interpret additional data encoded as codewords in the bitstream. The decoded information includes any desired information to decode the video signal, such as general control data, filter control data, partition information, motion data, prediction data, and quantized transform coefficients from residual blocks. The quantized transform coefficients are forwarded to an inverse transform and quantization component 429 for reconstruction into residual blocks. The inverse transform and quantization component 429 may be similar to inverse transform and quantization component 329.

The reconstructed residual blocks and/or prediction blocks are forwarded to intra-picture prediction component 417 for reconstruction into image blocks based on intra-prediction operations. The intra-picture prediction component 417 may be similar to intra-picture estimation component 215 and an intra-picture prediction component 217. Specifically, the intra-picture prediction component 417 employs prediction modes to locate a reference block in the frame and applies a residual block to the result to reconstruct intra-predicted image blocks. The reconstructed intra-predicted image blocks and/or the residual blocks and corresponding inter-prediction data are forwarded to a decoded picture buffer component 423 via an in-loop filters component 425, which may be substantially similar to decoded picture buffer component 223 and in-loop filters component 225, respectively. The in-loop filters component 425 filters the reconstructed image blocks, residual blocks and/or prediction blocks, and such information is stored in the decoded picture buffer component 423. Reconstructed image blocks from decoded picture buffer component 423 are forwarded to a motion compensation component 421 for inter-prediction. The motion compensation component 421 may be substantially similar to motion estimation component 221 and/or motion compensation component 219. Specifically, the motion compensation component 421 employs motion vectors from a reference block to generate a prediction block and applies a residual block to the result to reconstruct an image block. The resulting reconstructed blocks may also be forwarded via the in-loop filters component 425 to the decoded picture buffer component 423. The decoded picture buffer component 423 continues to store additional reconstructed image blocks, which can be reconstructed into frames via the partition information. Such frames may also be placed in a sequence. The sequence is output toward a display as a reconstructed output video signal.

Figure 5:
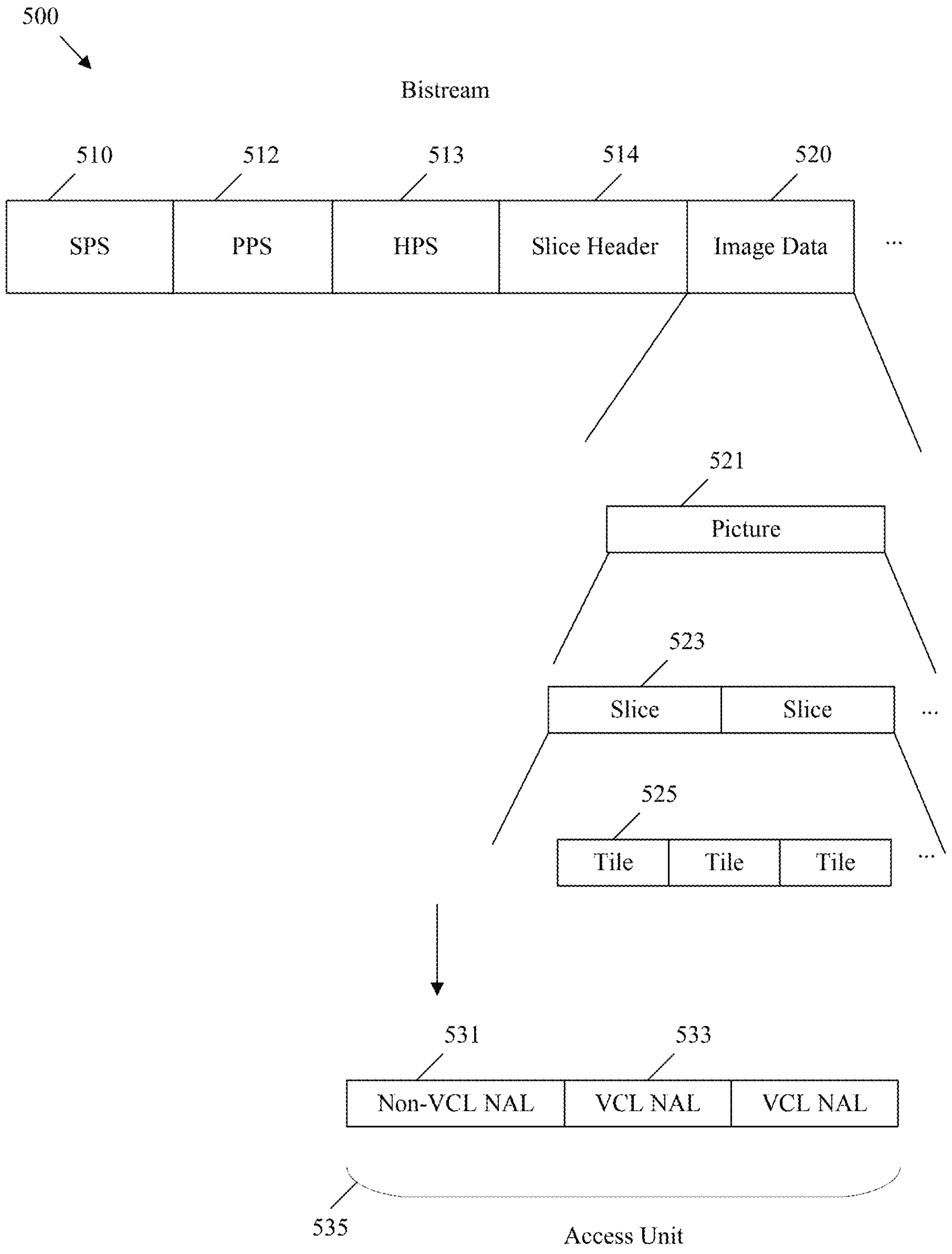
FIG. 5 is a schematic diagram illustrating an example bitstream containing an encoded video sequence with a header parameter set (HPS).

FIG. 5 is a schematic diagram illustrating an example bitstream 500 containing an encoded video sequence with an HPS 513. For example, the bitstream 500 can be generated by a codec system 200 and/or an encoder 300 for decoding by a codec system 200 and/or a decoder 400. As another example, the bitstream 500 may be generated by an encoder at step 109 of method 100 for use by a decoder at step 111.

The bitstream 500 includes a sequence parameter set (SPS) 510, a plurality of picture parameter sets (PPSs) 512, a plurality of HPSHPS 513, a plurality of slice headers 514, and image data 520. An SPS 510 contains sequence data common to all the pictures in the video sequence contained in the bitstream 500. Such data can include picture sizing, bit depth, coding tool parameters, bit rate restrictions, etc. The PPS 512 contains parameters that apply to an entire picture. Hence, each picture in the video sequence may refer to a PPS 512. It should be noted that, while each picture refers to a PPS 512, a single PPS 512 can contain data for multiple pictures in some examples. For example, multiple similar pictures may be coded according to similar parameters. In such a case, a single PPS 512 may contain data for such similar pictures. The PPS 512 can indicate coding tools available for slices in corresponding pictures, quantization parameters, offsets, etc. The slice header 514 contains parameters that are specific to each slice in a picture. Hence, there may be one slice header 514 per slice in the video sequence. The slice header 514 may contain slice type information, picture order counts (POCs), reference picture lists, prediction weights, tile entry points, deblocking parameters, etc.

An HPS 513 is a syntax structure containing syntax elements that apply to zero or more slices as determined by zero or more syntax elements found in slice headers. Hence, the HPS 513 contains syntax elements for coding tool's parameters related to multiple slices. The HPS 513 may also be referred to as an HPS in some systems. For example, one or more slices may refer to an HPS 513. Accordingly, a decoder can obtain the HPS 513 based on such references, obtain the coding tool parameters from the HPS 513, and employ the coding tool parameters to decode the corresponding slices. The HPS 513 conceptually occupies a hierarchical position between the PPS 512 and the slice header 514. For example, certain data may be relevant to multiple slices without being relevant to an entire picture. Such data may not be stored in a PPS 512 as the data is not relevant to the entire picture. However, such data would otherwise be included in multiple slice headers 514. The HPS 513 can accept such data to avoid redundant signaling across multiple slice headers 514. The HPS 513 coding structure is introduced in VVC and has no analogous structure in HEVC or earlier coding standards. Various implementations of the HPS 513 are discussed below.

The image data 520 contains video data encoded according to inter-prediction and/or intra-prediction as well as corresponding transformed and quantized residual data. For example, a video sequence includes a plurality of pictures 521 coded as image data. A picture 521 is a single frame of a video sequence and hence is generally displayed as a single unit when displaying the video sequence. However, partial pictures may be displayed to implement certain technologies such as virtual reality, picture in picture, etc. The pictures 521 each reference a PPS 512. The pictures 521 are divided into slices 523. A slice 523 may be defined as a horizontal section of a picture 521. For example, a slice 523 may contain a portion of the height of the picture 521 and the complete width of the picture 521. In some systems the slices 523 are subdivided into tiles 525. In other systems, the slices 523 are replaced by tile groups containing the tiles 525. The slices 523 and/or tile groups of tiles 525 reference a slice header 514 and/or an HPS 513. The tiles 525 may include a rectangular portion of the picture 521 and/or a portion of the picture 521 as defined by a column and row. The tiles 525 are further divided into coding tree units (CTUs). The CTUs are further divided into coding blocks based on coding trees. The coding blocks can then be encoded/decoded according to prediction mechanisms.

The bitstream 500 is coded into VCL NAL units 533 and non-VCL NAL units 531. A NAL unit is a coded data unit sized to be placed as a payload for a single packet for transmission over a network. A VCL NAL unit 533 is a NAL unit that contains coded video data. For example, each VCL NAL unit 533 may contain one slice 523 and/or tile group of data including corresponding tiles 525, CTUs, and/or coding blocks. A non-VCL NAL unit 531 is a NAL unit that contains supporting syntax, but does not contain coded video data. For example, a non-VCL NAL unit 531 may contain the SPS 510, a PPS 512, an HPS 513, a slice header 514, etc. As such, the decoder receives the bitstream 500 in discrete VCL NAL units 533 and non-VCL NAL units 531. An access unit 535 is a group of VCL NAL units 533 and/or non-VCL NAL units 531 that include data sufficient to code a single picture 521.

In some examples, the HPS 513 can be implemented as follows. The HPS 513 may be available in-band and/or out-of-band, where in-band signaling is included in the bitstream 500 and out-of-band is included in supporting metadata. The HPS 513 is included in a NAL unit, such as a non-VCL NAL unit 531, where the HPS 513 is identified by NAL unit type. An HPS 513 may contain parameters for coding tools such as, but not limited to, ALF, SAO, deblocking, quantization matrices, inter-prediction parameters, reference picture set construction related parameters, and/or reference picture list construction related parameters. HPS 513 may include a type. The type defines which coding tool parameters are contained in the HPS 513. Each HPS 513 may contain only one type of coding tool parameters. HPS 513 of different types may be grouped together into a Group of Parameter Sets (GPS). Instead of referring to a single HPS 513, a slice 523 may refer to a GPS. An HPS 513 may be made available at the decoder before being referenced by a corresponding slice 523 and/or tile group. Different slices 523 of a coded picture 521 may refer to different HPS 513. An HPS 513 can be placed at any slice 523 boundary in the bitstream 500. This allows for the re-use of the parameters in the HPS 513 (e.g., ALF parameters) even for all slices 523 of the current picture 521 following the HPS 513.

Reference from a slice header 514 to an HPS 513 may be optional. For example, slices 523 may reference an HPS 513 when the either the following is true. First, such referencing can be indicated in the corresponding PPS 512 that the HPS 513 is available for the bitstream 500. Second, slices 523 may reference an HPS 513 when at least one of coding tools whose parameters are contained in the HPS 513 is enabled for the bitstream 500. Each HPS 513 may be associated with an HPS ID. A slice 523 that refers to an HPS 513 should contain the HPS ID of the referenced HPS 513. The HPS ID may be coded with unsigned integer 0-th order Exp-Golomb-coded syntax element with the left bit first (e.g., ue(v)). The value of the HPS ID may be restricted, for example in the range of zero to sixty three inclusive. For each parameter of a coding tool, a flag may be present in the HPS 513 to indicate whether the parameter is present in the HPS 513. When a coding tool is enabled for a slice 523 and the parameters for the coding tool are present in the HPS 513 referred to by the slice 523, the parameters may not be signaled in the corresponding slice header 514. An HPS 513 may be fragmented into one or more NAL units and each fragment of an HPS 513 can be parsed and applied independently. A slice 523 may refer to a single HPS 513 or multiple HPS 513. When referencing multiple HPS 513 is allowed, each reference to an HPS 513 may be employed for resolving parameters of a particular coding tool.

The following implementations allow for HPS 513 to reference other HPS 513 and inherit coding tool parameters by such references. An HPS 513 may contain one or more references to other HPS 513. In such examples, an HPS 513 may be referred to as an intra HPS when the HPS 513 does not reference any other HPS 513. When an HPS 513 refers to another HPS 513, the referring HPS 513 may copy one or more parameters from the reference HPS 513. An HPS 513 may have multiple references to other HPS 513 with one reference HPS 513 for each parameters group. In some examples, a linked-list of HPS 513 may be formed as a series of HPS 513 are connected by a referencing mechanism. When parameters of a coding tool are specified as not present in an HPS 513 (e.g., the value of a presence flag is equal to zero), an additional flag may be present to indicate whether or not the parameters may be inferred from a reference HPS 513. Reference from an HPS 513 to another HPS 513 can be specified implicitly such that when parameters of a coding tool are not present in an HPS 513, such parameters are inferred to be the same as the parameters of the coding tool for the previous HPS 513.

In some cases an HPS 513 may no longer be present when invoking random access for an Instantaneous Decoder Refresh (IDR) and/or a Clean Random Access (CRA) picture. Therefore, two HPS buffers may be employed to store HPS 513 with each buffer activated alternatively at the beginning of each Intra Random Access Point (IRAP) picture. In such a case received HPS 513 are stored in the active HPS buffer. To improve error resiliency, a range of HPS IDs may be specified to indicate the HPS IDs that are in current use. When an HPS 513 has an HPS ID outside the in-use HPS ID range, an additional HPS 513 may use the HPS ID. The in-use HPS ID may then be updated following a sliding window approach. When this technique is used, an HPS 513 may only refer to other HPS 513 whose HPS ID is within the in-use range. A limit of the number of active HPS 513 may be defined in order to limit the HPS 513 storage requirements in the decoder memory. When the limit is reached and a new HPS 513 is received, the oldest (e.g., the earliest received) HPS 513 in the buffer may be removed and the new HPS 513 is inserted.

In some cases, all HPS 513 references may be resolved as soon as an HPS 513 is received by the decoder. For example, coding tool parameters may be copied immediately when the decoder receives an HPS 513 and the coding tool parameters are not available in the current HPS 513 but are available in a reference HPS 513. Another approach to improve error resilience may require an intra HPS 513 to be present during a specified period. When an intra HPS 513 is received, all available HPS 513 of the same type in the buffer may be discarded. When parameters of a coding tool are not present in an HPS 513, a flag may be present to indicate whether the coding tool is disabled for slices 523 that refer to the HPS 513. Further, a flag in a NAL unit header (e.g., nal_ref_flag) may specify whether the HPS 513 contained in the NAL unit can be referred to by slices 523 from a picture 521 that is used as reference. For example, the HPS 513 may only be referred to by slices 523 of non-referenced pictures 521 when nal_ref_flag of the NAL unit containing an HPS 513 is equal to zero. This flag may also be used to determine which HPS 513 can be used as reference for other HPS 513. For example, an HPS 513 may not refer to other HPS 513 that are contained in a NAL unit with nal_ref_flag equal to zero. A reset period for an HPS buffer may be specified in the SPS 510. The HPS 513 buffer may be reset at the occurrence of an IRAP picture.

As can be appreciated from reviewing the preceding implementations, allowing HPS 513 to reference other HPS 513 may be quite complicated. Accordingly, in the disclosed examples, HPS 513 may be restricted from referring to other HPS 513. Instead, multiple types of HPS 513 may be employed. An HPS 513 type indicates the type of coding tool parameters contained in the HPS 513. Such HPS 513 types may include an ALF HPS, a LMCS HPS, and/or a scaling list parameters HPS. An ALF HPS is an HPS that contains coding tool parameters used as part of adaptive loop filtering of corresponding slices. An LMCS HPS contains coding tool parameters employed for LMCS mechanisms. LMCS is a filtering technique that reshapes luma components based on mappings to corresponding chroma components in order to reduce rate distortion. A scaling list parameters HPS contains coding tool parameters associated with quantization matrices used by specified filters. In such an example, when a current HPS 513 of a first type is obtained by a decoder, previous HPS 513 of the first type can be discarded as the current HPS 513 replaces such previous HPS 513. Further, to allow for multiple types HPS 513, a single slice header 514 may refer to more than one HPS 513 to reference all the coding tool parameters for a corresponding slice 523 and/or tile group. This is in contrast to other schemes that allow for a slice header 514 to refer to a single HPS 513, which then refer to other HPS 513. Accordingly, allowing a single slice header 514 to refer to multiple HPS 513 results in an implementation that avoids HPS 513 reference chains. This approach significantly reduces complexity, and hence reduces processing resource usage at both the encoder and decoder. Further, this process reduces the number of HPS 513 that are buffered at a decoder. For example, only one HPS 513 of each type may be buffered at the decoder. This reduces memory usage at the decoder. Further, by avoiding HPS 513 reference chains, potential errors are localized, and hence reduced. This is because losing an HPS 513 during a transmission error may only affect the slices 523 that directly reference the HPS 513. As such, the disclosed mechanisms create improvements at both the encoder and decoder when employing an HPS 513 in a bitstream 500.

Figure 6:
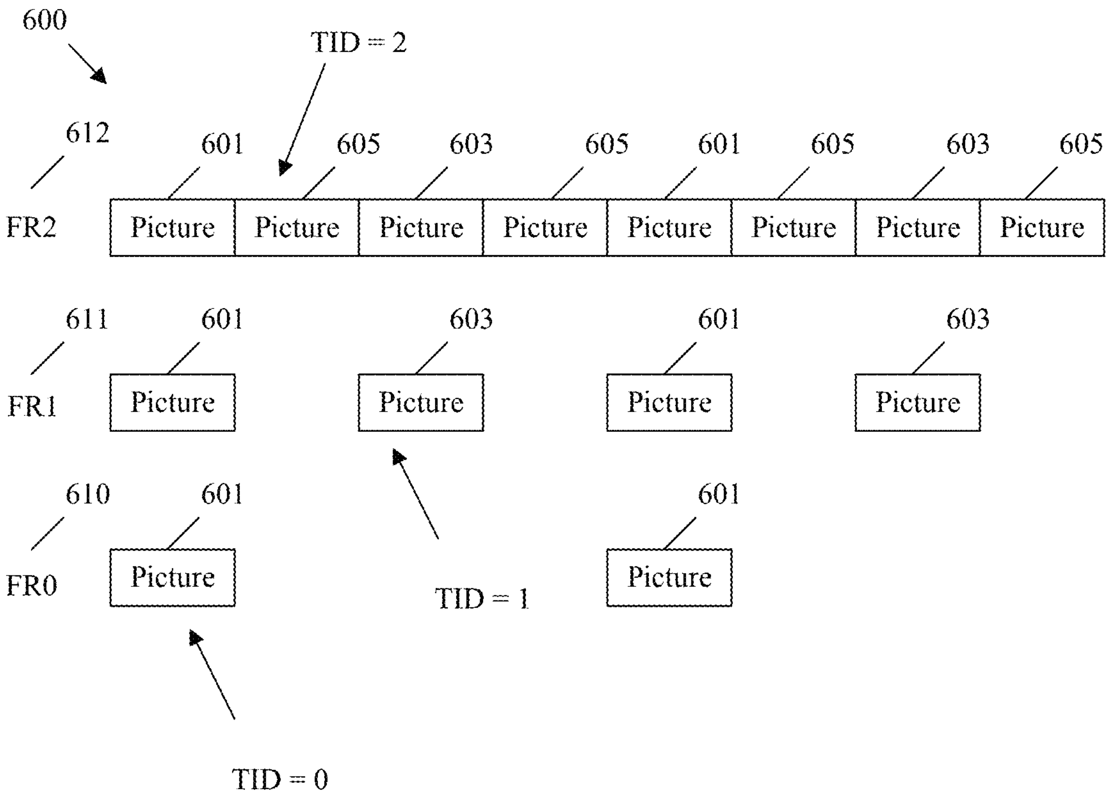
FIG. 6 is a schematic diagram illustrating an example mechanism for temporal scaling.

FIG. 6 is a schematic diagram illustrating an example mechanism 600 for temporal scaling. For example, the mechanism 600 may be employed by a decoder, such as codec system 200 and/or decoder 400 when displaying a decoded bitstream, such as bitstream 500. Further, the mechanism 600 may be employed as part of step 117 of method 100 when outputting a video for display. Also, an encoder, such as codec system 200 and/or encoder 300 may encode data in the bitstream to allow mechanism 600 to occur at the decoder.

Mechanism 600 operates on a plurality of decoded pictures 601, 603, and 605. The pictures 601, 603, and 605 are part of an ordered video sequence and have been decoded from a bitstream, for example by employing the mechanisms described above. The bitstream is encoded to allow a decoder to display the video sequence at one of a plurality of frame rates, including a first frame rate (FR0) 610, a second frame rate (FR1) 611, and a third frame rate (FR2) 612. A frame rate is a measure of a frequency at which frames/pictures of a video sequence are displayed. The frame rate may be measured in frames over time. The differences in frame rate allow different decoders to display the same video sequence at different quality to account for variations in decoder capability. For example, decoders with reduced hardware capability and/or decoders streaming from a poor quality network connection may display at FR0 610. As another example, high quality decoders with access to a fast network connection may display at FR2 612. As yet another example, decoders with certain impairments may be capable of displaying at FR1 611, but may not be capable of displaying at FR2 612. Accordingly, temporal scaling (e.g., mechanism 600) is employed to allow each decoder to display video at the highest frame rate possible for the best user experience based on varying decoder side capabilities and constraints. In most systems, each frame rate is double the frequency of the previous frame rate. For example, FR0 610, FR1 611, and FR2 612 may be set as fifteen frames per second (FPS), thirty FPS, and sixty FPS, respectively.

In order to implement temporal scaling, the pictures 601, 603, and 605 are coded into the bitstream by the encoder at the highest possible frame rate, in this case FR2 612. The encoder also assigns each picture 601, 603, and 605 a temporal identifier (TID). Pictures 601, 603, and 605 have received a TID of zero, one, and two, respectively. When displaying the resulting decoded video, the decoder selects a frame rate, determines a corresponding frame rate TID, and displays all frames with a TID that is equal to or less than the frame rate TID. Pictures with a TID that is greater than the frame rate TID of the selected frame rate are ignored. For example, a decoder selecting FR2 612 displays all pictures with a TID of two or less, and hence displays all pictures 601, 603, and 605. As another example, a decoder selecting FR1 611 displays all pictures with a TID of one or less, and hence displays pictures 601 and 603, while ignoring pictures 605. As another example, a decoder selecting FR0 610 displays all pictures with a TID of zero or less, and hence displays pictures 601, while ignoring pictures 603 and 605. By employing this mechanism 600, the video sequence can be temporally scaled by a decoder to a selected frame rate.

The HPS 513, as described in FIG. 5, can be implemented to support the temporal scaling of mechanism 600. This can be accomplished by assigning a TID, such as TID zero, TID one, or TID two, to each HPS. When temporal scaling is performed, HPS with a TID equal to or less than the selected frame rate TID are decoded and HPS with a TID that is greater than the selected frame rate TID are discarded. The TID can be assigned to the HPS according to various embodiments.

Referring to FIG. 5, in one example, an HPS 513 may receive the temporal ID of the picture 521 that contains the first slice 523 that refers the HPS 513. In other examples, the HPS 513 may receive the temporal ID of the access unit 535 that contains the HPS 513. To further support temporal scaling, slices 523 associated with lower temporal IDs may be restricted from referring to HPS 513 that contain greater temporal IDs. This ensures that lower frame rate settings do not cause a slice 523 to refer to an HPS 513 that is ignored due to temporal scaling of mechanism 600, and hence prevents coding tool parameters from being unavailable when decoding certain slices 523 at lower frame rates, such as FR0 610 and/or FR1 611.

The preceding mechanisms can be implemented as follows. The following aspects can be applied individually and/or in combination. An Adaptation Parameter Set (APS) is another name for an HPS. The availability of HPS for a bitstream may be all available in-band, all are available out-of-band, and/or some available in-band and some available out-of-band. When provided out-of-band, HPS may be present in the following. In the ISO-based media file format, HPS may be present in a sample entry (e.g., a sample description box). In the ISO-based media file format, HPS may be present in a time-synchronized track, such as a parameter set track or a timed metadata track.

In a particular implementation, when provided out-of-band, HPSs may be carried as follows. In the ISO-based media file format, when no HPS update exists HPSs may be present only in the sample entry (e.g., the sample description box). No HPS update may exist when an HPS identifier (ID) is reused while other HPS parameters are different than the earlier sent HPS with the same HPS ID. When an HPS update exists, for example when the HPS contains adaptive loop filter (ALF) parameters, in the International Organization for Standardization (ISO)-based media file format, HPSs may be carried in a time-synchronized track, such as a parameter set track or a timed metadata track. This way, the slices each containing a group of complete tiles may be carried in their own file format tracks. Further, the HPSs may be carried in a time-synchronized track. Consequently, these tracks can each be carried in a Dynamic Adaptive Streaming of Hypertext transfer protocol (DASH) representation. For decoding and rendering of a subset of the slice/tile tracks, the DASH representations containing the subset of the slice/tile tracks as well as the DASH representation containing the HPSs may be requested by the client in a segment by segment fashion.

In another example, HPSs can be specified as always provided in-band. HPSs may also be carried in a time-synchronized track, such as a parameter set track or a timed metadata track. Consequently, the HPS can be delivered as described above. Furthermore in the specification of the file format for the video codec, a bitstream reconstruction process may construct an output bitstream out of a subset of the slice/tile tracks and the time-synchronized track containing the HPSs such that the HPSs are part of the output bitstream.

An HPS should be present and/or available to the decoder in decoding order and prior to the first slice that refers to the HPS. For example, if an HPS is available in-band, the HPS may precede, in decoding order, the first slice that refers to the HPS. Otherwise, the HPS decoding time should be equal or less than the decoding time of the first slice that refers to the HPS.

An HPS may include the ID of a sequence level parameter set, such as a SPS. When an SPS ID is not present in HPS, the following constraints may apply. When the first slice that refers to the HPS is part of an Intra Random Access Point (IRAP) picture and the HPS is carried in-band, the HPS may be present in the IRAP access unit. When the first slice that refers to the HPS is part of an IRAP picture and the HPS is carried out-of-band, the decoding time of the HPS may be the same as the decoding time of the IRAP picture. When the first slice that refers to the HPS is not part of an IRAP picture and the HPS is carried in-band, the HPS may be present in one of the access units between the IRAP access unit that starts the coded video sequence and the access unit that contains the slice, inclusively. When the first slice that refers to the HPS is not part of an IRAP picture and the HPS is carried out-of-band, the decoding time of the HPS may be between the decoding time of the IRAP access unit that starts the coded video sequence and the decoding time of the access unit that contains the slice, inclusively.

When an SPS ID is present in HPS, the following may apply. If provided in-band, an HPS may be present in the beginning of a bitstream or in any coded sequence as long as the HPS precedes the first slice that refers to the HPS in decoding order. Otherwise, an HPS may be present in the sample entry or in a time-synchronized track as long as the HPS decoding time is less than the decoding time of the first slice that refers to the HPS.

For the slice reference to HPS, the following may apply. If an SPS ID is present in HPS, each slice and the HPS that the slice refers to may refer to the same SPS. Otherwise, a slice may not refer to an HPS that is present in the access unit that precedes the IRAP access unit the slice is associated with. A slice may also be restricted from referring to an HPS that has a decoding time less than the decoding time of the IRAP access unit the slice is associated with.

As an alternative to using a flag to specify the presence of parameters of a coding tool in an HPS, a two-bit indicator may be used (e.g., coded as u(2)). The semantic of the indicator is defined as follows. One value of the indicator (e.g., value zero) specifies that the parameters are not present in the HPS and no reference another HPS is present to derive the parameters. Another value of the indicator (e.g., value one) specifies that the parameters are not present in the HPS and a reference to another HPS is present to derive the parameters. Another value of the indicator (e.g., value two) specifies that the parameters are present in the HPS and no reference to another HPS is present. Another value of the indicator may be reserved. In another example, another value of the indicator (e.g., value three) specifies that the parameters are present in the HPS and a reference another HPS is present for deriving the parameters. In this case, the final parameters are derived with input from the parameters that are explicitly signaled in the HPS and the parameters that are present in the reference HPS.

When a coding tool is specified to be disabled for the coded video sequence by any means of indication (e.g., the enable flag in the sequence parameter flag specifies that the coding tool is disabled), the following constraints may apply, individually or in combination. The flag or the indication of the presence of the parameters for the coding tool and the parameters for the coding tools may not be present in the HPS associated with the coded video sequence. The flag or the indication of the presence of the parameters for the coding tool may be present but constrained such that the value specifies that the parameters for the coding tool is not present and no reference HPS for deriving and/or inferring the parameters is present.

When a slice refers to an HPS that may contain parameters of a coding tool, the following constraints may apply individually or in combination. When the coding tool is enabled for the slice and the parameters of the coding tool are available in the HPS the parameters of the coding tool may not be present in the slice header. This may occur when the coding tool parameters are directly signaled and/or present in the HPS or available through a reference HPS. When the coding tool is enabled for the slice and the parameters of the coding tool are not available in the HPS, the parameters of the coding tool may be present in the slice header. This may occur when the coding tool parameters are not directly signaled and/or present in the HPS or available through a reference HPS. When the coding tool is enabled for the slice and the parameters of the coding tool are available in the HPS, the parameters of the coding tool may also be present in the slice header. This may occur when the coding tool parameters are directly signaled and/or present in the HPS or available through a reference HPS. In this case, the parameters that are used for invoking the coding tool during decoding of the slice are the ones that are present in the slice header.

When both in-band and out-of-band transport of HPS are used, the following may apply. If an HPS is carried in-band, the HPS may not refer to another HPS that is carried out-of-band. Otherwise, the HPS may not refer to another HPS that is carried in-band.

When both in-band and out-of-band transport of HPS are used, the following constraints may further apply individually or in combination. HPSs that are carried out-of-band may be carried in a time-synchronized track only. HPSs may be carried out-of-band only when a HPS update exists.

Alternative to coding HPS ID as an unsigned integer zeroth order Exp-Golomb-coded syntax element (ue(v)) with the left bit first, an HPS ID may be coded as u(v). The number of bits for signaling an HPS ID may be specified in the SPS.

Two HPSs in the same coded video sequence may have the same HPS ID, in which case the following may apply. When an HPS A and an HPS B have the same HPS ID, HPS B follows HPS A in decoding order, and SPS contains an ID referencing the HPS ID, then HPS B replaces HPS A. When HPS A and HPS B have the same HPS ID, a decoding time of HPS B is greater than decoding time of HPS A, and SPS contains an ID referencing the HPS ID, then HPS B replaces HPS A. Let HPS A, HPS B, HPS C, and HPS D be HPSs that are included in the same coded video sequence, either by having the same SPS ID (e.g., when SPS ID is present in HPS) or by the association of the access units that contain the HPSs. When HPS ID of HPS A and HPS D are the same and HPS IDs of HPS A, HPS B, and HPS C are unique, the value of HPS IDs of HPS A, HPS B, and HPS C may be constrained to be monotonously increasing. A flag may be present in the SPS to specify whether an HPS may refer to another reference HPS.

When reference among HPSs is not allowed, a slice header may have multiple references to the same HPS or different HPSs. In this case, the following may apply. An HPS reference may be present for each coding tool that is enabled for the slice and the parameters of the coding tool may be inferred from the HPS. When the slice refers to an HPS for inferring the parameters of a coding tool, the parameters of the coding tool should be present in that HPS.

When parameters of a coding tool are not present in an HPS and a reference to another HPS is present for the parameters, the parameters should be present in that reference HPS. An HPS may not refer to another HPS from different coded video sequence. If an SPS ID is present in an HPS the value of the SPS ID of both the current HPS and a corresponding reference HPS should be the same. Otherwise, an HPS may not refer to another HPS that is present in the access unit that precedes the last IRAP access unit that precedes the HPS in decoding order. An HPS may also not refer to another HPS with a decoding time less than the decoding time of the last IRAP access unit that precedes the HPS in decoding order or the last IRAP access unit with a decoding time is the closest to and less than the decoding time of the HPS.

When an HPS refers to another HPS, the HPS ID of the reference HPS should be less than the HPS ID of the HPS. When an SPS ID is present in any HPS, an HPS A, HPS B, HPS C, and HPS D may all have the same SPS ID. When HPS B follows HPS A in decoding order, HPS C follows HPS B in decoding order, and HPS D follows HPS C in decoding order, the following constraints may apply, individually or in combination. When HPS C refers to HPS A, the HPS ID of HPS B may not be the same as HPS ID of HPS A. When HPS B refers to HPS A and HPS C has the same HPS ID with HPS A, then HPS D may not refer to an HPS A nor HPS B. When HPS B and HPS A have the same HPS ID, there may be no slice that follows HPS B in decoding order that refers to HPS A. When HPS B refers to HPS A and HPS C has the same HPS ID as HPS A, there may be no slice that follows HPS C in decoding order that refers to either HPS A or HPS B.

When temporal scalability is used, the temporal ID for an HPS may be specified as follows. The temporal ID of an HPS may be set to be the same as the temporal ID of the access unit that contains the HPS. In one example, temporal ID of an HPS may be set to be the same as the temporal ID of the picture of the first slice that refers to the HPS.

A slice in a picture with temporal ID (Tid) A may not refer to an HPS with ID Tid B where Tid B is greater than Tid A. An HPS with Tid A may not refer to a reference HPS with Tid B where Tid B is greater than Tid A. An HPS with Tid A may not replace another HPS with Tid B where Tid A is greater than Tid B.

A flag in the sequence level parameter (e.g., SPS) may be present to specify whether slices have reference to HPS. The value of the flag, when set equal to one, may specify that a slice refers to an HPS and may specify that an HPS ID is present in the header of the slice. The value of the flag, when set equals to zero, may specify that the slice does not refer to an HPS and that no HPS ID is present in the header of the slice.

The preceding aspects may be implemented according to the following syntax.

| | Descriptor |
|---|---|
| seq_parameter_set_rbsp( ) { | |
| . . . | |
| hps_present_flag | u(1) |
| . . . | |
| } | |

The hps_present_flag can be set equal to one to specify that an hps_id is present in a slice header. The hps_present_flag can be set equal to zero to specify that the hps_id is not present in slice header.

| | Descriptor |
|---|---|
| header_parameter_set_rbsp( ) { | |
| header_parameter_set_id | ue(v) |
| hps_seq_parameter_set_id | ue(v) |
| . . . | |
| alf_parameters_idc[ header_parameter_set_id ] | u(1) |
| if( alf_parameters_idc[ header_parameter_set_id ] = = 2 ) | |
| alf_data( ) | |
| else if (alf_parameters_idc[ header_parameter_set_id ] = = 1 ) | |
| alf_ref_hps_id[ header_parameter_set_id ] | ue(v) |
| . . . | |
| } | |

The header_parameter_set_id may identify the HPS for reference by other syntax elements. The value of hdr_parameter_set_id may be in the range of zero to sixty three, inclusive. The hps_seq_parameter_set_id specifies the value of sps_seq_parameter_set_id for the active SPS. The value of pps_seq_parameter_set_id may be in the range of zero to fifteen, inclusive. The alf_parameters_idc [header_parameter_set_id] may be set equal to two to specify that alf_data( ) is present in the HPS. The alf_parameters_idc [header_parameter_set_id] may be set equal to one to specifies that alf_data( ) is not present in the HPS but inferred to be the same as alf_data( ) that is present in the reference HPS specified by alf_ref_hps_id [header_parameter_set_id]. The alf_parameters_idc [header_parameter_set_id] may be set equal to zero to specify that neither alf_data( ) nor alf_ref_hps_id [header_parameter_set_id] is present in the HPS. The value of alf_parameters_idc [header_parameter_set_id] equal to three may be reserved. The alf_ref_hps_id [header_parameter_set_id] may specifies the header_parameter_set_id of the reference HPS to infer the value of alf_data( ) from.

An example bitstream conformance check may require that the following constraints apply. When present, the value of alf_ref_hps_id [header_parameter_set_id] may be less than the value of header_parameter_set_id. The value of hps_seq_parameter_set_id in the current HPS and in the HPS specified by alf_ref_hps_id [header_parameter_set_id] may be the same. The value of alf_parameters_idc[alf_ref_hps_id [header_parameter_set_id]] may be equal to two.

Given HPS A with header_parameter_set_id equal to hpsA, HPS B with header_parameter_set_id equal to hpsB, HPS C with header_parameter_set_id equal to hpsC, and the current HPS, when the following conditions are true, the value of alf_ref_hps_id [header_parameter_set_id] may not be equal to hpsA or hpsB. Such conditions are that the HPS A precedes HPS B in decoding order, HPS B precedes HPS C in decoding order, and HPS C precedes the current HPS in decoding order. Such conditions also include that the value of alf_ref_id[hpsB] is equal to hpsA and the value of hpsC is equal to hpsA.

| | Descriptor |
|---|---|
| slice_header( ) { | |
| . . . | |
| if( hps_present_flag ) | |
| slice_hps_id | ue(v) |
| . . . | |
| if ( sps_alf_enabled_flag ) { | |
| slice_alf_enabled_flag | u(1) |
| if( | |
| slice_alf_enabled_flag && | |
| alf_parameters_idc slice_hps_id ] = = 0 ) | |
| alf_data( ) | |
| } | |
| . . . | |
| } | |

The slice_hpsd specifies the header_parameter_set_id of the HPS that the slice refers to. When slice_hps_id is not present, alf_parameters_idc[slice_hps_id] is inferred to be equal to zero. An example bitstream conformance check may require that the following constraints apply. The HPS with header_parameter_set_id equal to slice_hps_id should be available prior to the parsing of the slice header. When the HPS with header_parameter_set_id equal to slice_hps_id is available in-band, header_parameter_set_id should be present in one of the following access units. The IRAP access unit that is associated with the picture of the current slice, or any access unit that follows the IRAP access unit but precedes the current access unit, in decoding order, or the current access unit. Given HPS A with header_parameter_set_id equal to hpsA, HPS B with header_parameter_set_id equal to hpsB, HPS C with header_parameter_set_id equal to hpsC, and the current slice, when both of the following conditions are true, then the value of slice_hps_id shall not be equal to hpsA or hpsB. The conditions include that HPS A precedes HPS B in decoding order, HPS B precedes HPS C in decoding order, and HPS C precedes the current slice in decoding order. The conditions also include that the value of alf_ref_id[hpsB] is equal to hpsA and the value of hpsC is equal to hpsA.

Another example implementation is described below.

| | Descriptor |
|---|---|
| header_parameter_set_rbsp( ) { | |
| header_parameter_set id | ue(v) |
| hps_seq_parameter_set_id | ue(v) |
| . . . | |
| if( sps_alf_enabled_flag ) { | |
| alf_parameters_idc[ header_parameter_set_id ] | u(1) |
| if( alf_parameters_idc[ header_parameter_set_id ] = = 2 ) | |
| alf_data( ) | |
| else if (alf_parameters_idc[ header_parameter_set_id ] = = ) | |
| alf_ref_hps_id[ header_parameter_set_id ] | ue(v) |
| } | |
| . . . | |
| } | |

The alf_parameters_idc [header_parameter_set_id] may be set equal to two to specify that alf_data( ) is present in the HPS. The alf_parameters_idc [header_parameter_set_id] may be set equal to one to specify that alf_data( ) is not present in the HPS but inferred to be the same as alf_data( ) that is present in the reference HPS specified by alf_ref_hps_id [header_parameter_set_id]. The alf_parameters_idc [header_parameter_set_id] may be set equal to zero specifies that neither alf_data( ) nor alf_ref_hps_id [header_parameter_set_id] is present in the HPS. When not present, alf_parameters_idc [header_parameter_set_id] may be inferred to be equal to zero. The value of alf_parameters_idc [header_parameter_set_id] equal to three may be reserved.

Another example implementation is included below.

A slice header may refer to multiple HPS. Slices of a pictures can refer to HPS for ALF parameters (e.g., pic_alf_HPS_id_luma[i], HPS for LMCS parameters (e.g., pic_lmcs_aps_id), and HPS for scaling list parameter (e.g., pic_scaling_list_aps_id). A pic_alf_aps_id_luma[i] specifies the adaptation_parameter_set_id of the i-th ALF HPS that the luma component of the slices associated with the Picture Header (PH) refers to. A slice_alf_aps_id_luma[i] specifies the adaptation_parameter_set_id of the i-th ALF HPS that the luma component of the slice refers to. The TemporalId of the HPS NAL unit having aps_params_type equal to ALF_APS and adaptation_parameter_set_id equal to slice_alf_aps_id_luma[i] shall be less than or equal to the TemporalId of the coded slice NAL unit. When slice_alf_enabled_flag is equal to 1 and slice_alf_aps_id_luma[i] is not present, the value of slice_alf_aps_id_luma[i] is inferred to be equal to the value of pic_alf_aps_id_luma[i]. A pic_lmcs_aps_id specifies the adaptation_parameter_set_id of the LMCS HPS that the slices associated with the PH refers to. The TemporalId of the HPS NAL unit having aps_params_type equal to LMCS_APS and adaptation_parameter_set_id equal to pic_lmcs_aps_id shall be less than or equal to the TemporalId of the picture associated with PH. A pic_scaling_list_aps_id specifies the adaptation_parameter_set_id of the scaling list HPS. The TemporalId of the HPS NAL unit having aps_params_type equal to SCALING_APS and adaptation_parameter_set_id equal to pic_scaling_list_aps_id shall be less than or equal to the TemporalId of the picture associated with PH.

The TemporalId of an HPS NAL unit shall be the same as the access unit (AU) containing the HPS. The TemporalId of an HPS NAL unit shall be less than or equal to the TemporalId of a coded slice NAL unit that refers to the HPS. In a specific example, the value of TemporalId for non-VCL NAL units is constrained as follows. If nal_unit_type is equal to DPS_NUT, VPS_NUT, or SPS_NUT, TemporalId shall be equal to zero and the TemporalId of the AU containing the NAL unit shall be equal to zero. Otherwise, if nal_unit_type is equal to PH_NUT, TemporalId shall be equal to the TemporalId of the PU containing the NAL unit. Otherwise if nal_unit_type is equal to EOS_NUT or EOB_NUT, TemporalId shall be equal to zero. Otherwise, if nal_unit_type is equal to AUD_NUT, FD_NUT, PREFIX_SEI_NUT, or SUFFIX_SEI_NUT, TemporalId shall be equal to the TemporalId of the AU containing the NAL unit. Otherwise, when nal_unit_type is equal to PPS_NUT, PREFIX_APS_NUT, or SUFFIX_APS_NUT, TemporalId shall be greater than or equal to the TemporalId of the PU containing the NAL unit. When the NAL unit is a non-VCL NAL unit, the value of TemporalId is equal to the minimum value of the TemporalId values of all AUs to which the non-VCL NAL unit applies. When nal_unit_type is equal to PPS_NUT, PREFIX_APS_NUT, or SUFFIX_APS_NUT, TemporalId may be greater than or equal to the TemporalId of the containing AU, as all PPSs and HPSs may be included in the beginning of the bitstream (e.g., when they are transported out-of-band, and the receiver places them at the beginning of the bitstream), wherein the first coded picture has TemporalId equal to zero.

Figure 7:
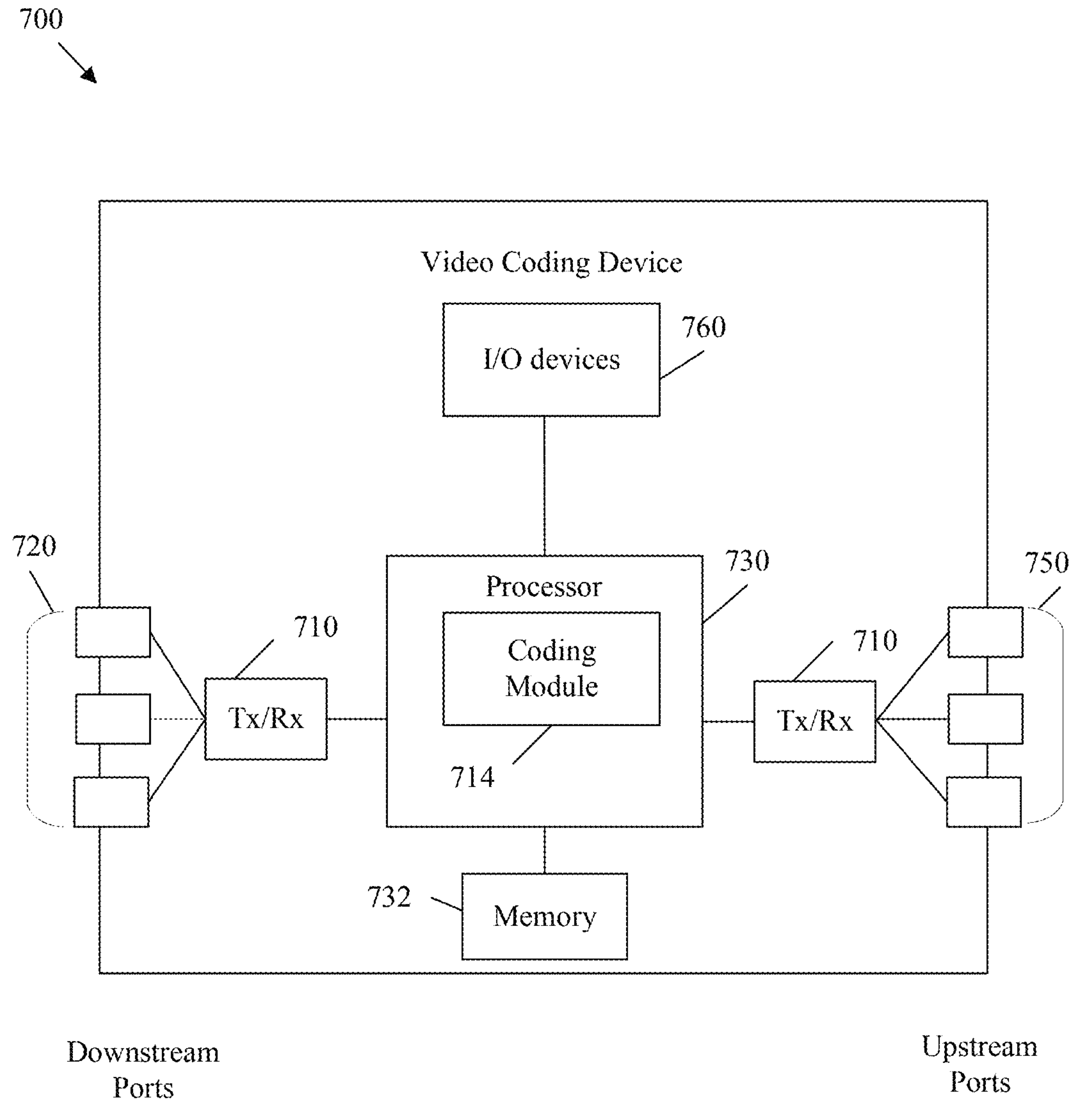
FIG. 7 is a schematic diagram of an example video coding device.

FIG. 7 is a schematic diagram of an example video coding device 700. The video coding device 700 is suitable for implementing the disclosed examples/embodiments as described herein. The video coding device 700 comprises downstream ports 720, upstream ports 750, and/or transceiver units (Tx/Rx) 710, including transmitters and/or receivers for communicating data upstream and/or downstream over a network. The video coding device 700 also includes a processor 730 including a logic unit and/or central processing unit (CPU) to process the data and a memory 732 for storing the data. The video coding device 700 may also comprise electrical, optical-to-electrical (OE) components, electrical-to-optical (EO) components, and/or wireless communication components coupled to the upstream ports 750 and/or downstream ports 720 for communication of data via electrical, optical, or wireless communication networks. The video coding device 700 may also include input and/or output (I/O) devices 760 for communicating data to and from a user. The I/O devices 760 may include output devices such as a display for displaying video data, speakers for outputting audio data, etc. The I/O devices 760 may also include input devices, such as a keyboard, mouse, trackball, etc., and/or corresponding interfaces for interacting with such output devices.

The processor 730 is implemented by hardware and software. The processor 730 may be implemented as one or more CPU chips, cores (e.g., as a multi-core processor), field-programmable gate arrays (FPGAs), application specific integrated circuits (ASICs), and digital signal processors (DSPs). The processor 730 is in communication with the downstream ports 720, Tx/Rx 710, upstream ports 750, and memory 732. The processor 730 comprises a coding module 714. The coding module 714 implements the disclosed embodiments described above, such as methods 100, 800, and 900, which may employ a bitstream 500 and/or mechanism 600. The coding module 714 may also implement any other method/mechanism described herein. Further, the coding module 714 may implement a codec system 200, an encoder 300, and/or a decoder 400. For example, the coding module 714 can encode/decode pictures in a bitstream and encode/decode parameters associated with slices of the pictures in a plurality of HPS. Various types of HPS can be included with corresponding types of coding tool parameters. Slice headers can then refer to the various types of HPS to obtain coding tool parameters for corresponding slices. Such HPS can also be assigned temporal IDs to function with temporal scaling algorithms. The usage of HPS allows coding tool parameters that are employed by multiple slices to aggregated into a single location (e.g., with additional HPS when parameters change). Accordingly, redundant signaling is removed, which increases coding efficiency, reduces memory resource usage when storing the bitstream, and reduces network resource usage when communicating the bitstream. Hence, coding module 714 causes the video coding device 700 to provide additional functionality and/or coding efficiency when coding video data. As such, the coding module 714 improves the functionality of the video coding device 700 as well as addresses problems that are specific to the video coding arts. Further, the coding module 714 effects a transformation of the video coding device 700 to a different state. Alternatively, the coding module 714 can be implemented as instructions stored in the memory 732 and executed by the processor 730 (e.g., as a computer program product stored on a non-transitory medium).

The memory 732 comprises one or more memory types such as disks, tape drives, solid-state drives, read only memory (ROM), random access memory (RAM), flash memory, ternary content-addressable memory (TCAM), static random-access memory (SRAM), etc. The memory 732 may be used as an over-flow data storage device, to store programs when such programs are selected for execution, and to store instructions and data that are read during program execution.

Figure 8:
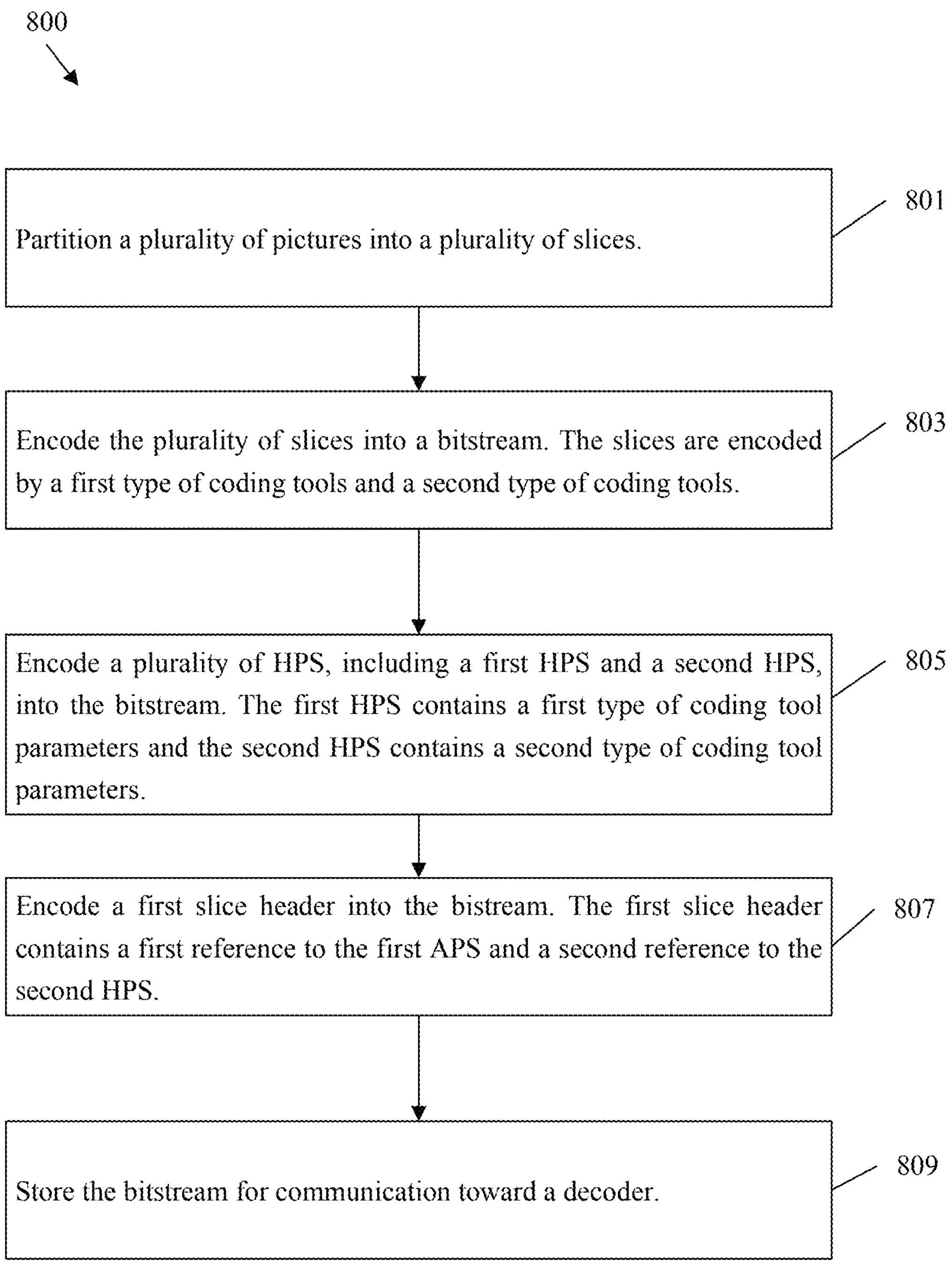
FIG. 8 is a flowchart of an example method of encoding a video sequence into a bitstream by using an HPS.

FIG. 8 is a flowchart of an example method 800 of encoding a video sequence into a bitstream, such as bitstream 500, by using an HPS. Method 800 may be employed by an encoder, such as a codec system 200, an encoder 300, and/or a video coding device 700 when performing method 100. Method 800 may also encode a bitstream to support temporal scaling according to mechanism 600 at a decoder, such as decoder 400.

Method 800 may begin when an encoder receives a video sequence including a plurality of images and determines to encode that video sequence into a bitstream, for example based on user input. The video sequence is partitioned into pictures/images/frames for further partitioning prior to encoding. At step 801, a plurality of pictures are partitioned into a plurality of slices including a first slice.

At step 803, the plurality of slices, including the first slice, is encoded into a bitstream. The slices may be encoded by a plurality of coding tool parameters. In some examples, a slice is encoded by at least a first type of coding tools and a second type of coding tools. Specifically, the slice is encoded by the first type of coding tools based on a first type of coding tool parameters. The slice is also encoded by a second type of coding tools based on a second type of coding tool parameters. For example, such coding tools may include ALF coding tools, LMCS coding tools, and/or scaling list parameter coding tools.

At step 805, a plurality of HPS is encoded into the bitstream. The plurality of HPS may include at least a first HPS and a second HPS. The first HPS contains the first type of coding tool parameters and the second HPS contains the second type of coding tool parameters as employed to encode the slice at step 803.

At step 807, a first slice header is encoded into the bitstream. The first slice header describes the encoding of a first slice of the plurality of slices to support decoding at the decoder. For example, the first slice header may contain a first reference to the first HPS and a second reference to the second HPS. Hence, the slice header may inherit coding tool parameters from a plurality of HPS of different types. This allows such coding tool parameters to be omitted from the slice headers and increases coding efficiency of the bitstream by reducing redundant coding tool parameter signaling. As a specific example, the first HPS and the second HPS may include an ALF HPS, a LMCS HPS, a scaling list parameters HPS, or combinations thereof.

To reduce complexity of HPS related coding methods, the HPS may be restricted from referencing coding tool parameters stored in other HPS. Accordingly, the plurality of HPS encoded at step 805, which include the first HPS and the second HPS, is restricted from referencing coding tool parameters from other HPS in the plurality of HPS. Also, the HPS may be encoded to support temporal scaling by including a temporal ID in each HPS. In one example, the first HPS is contained in an access unit associated with a temporal ID. Further, the first HPS contains the same temporal ID that is associated with the access unit that contains the first HPS. In another example, the first slice is partitioned from a first picture, and the first picture is associated with a temporal ID. In this example, the first HPS contains the temporal ID associated with the picture. Further, to support temporal scaling, each of the plurality of HPS and each of the slices are associated with one of a plurality of temporal IDs. Further, each slice with a first temporal ID is restricted from referring to any HPS with a second temporal ID that is greater (e.g., associated with a higher frame rate) than the first temporal ID. This ensures that slices associated with lower frame rates do not refer to HPS associated with higher frame rates, as such HPS are ignored when lower frame rates are employed according to temporal scaling mechanisms.

At step 809, the bitstream is stored in memory. Upon request, the bitstream can then be communicated toward a decoder, for example via a transmitter.

Figure 9:
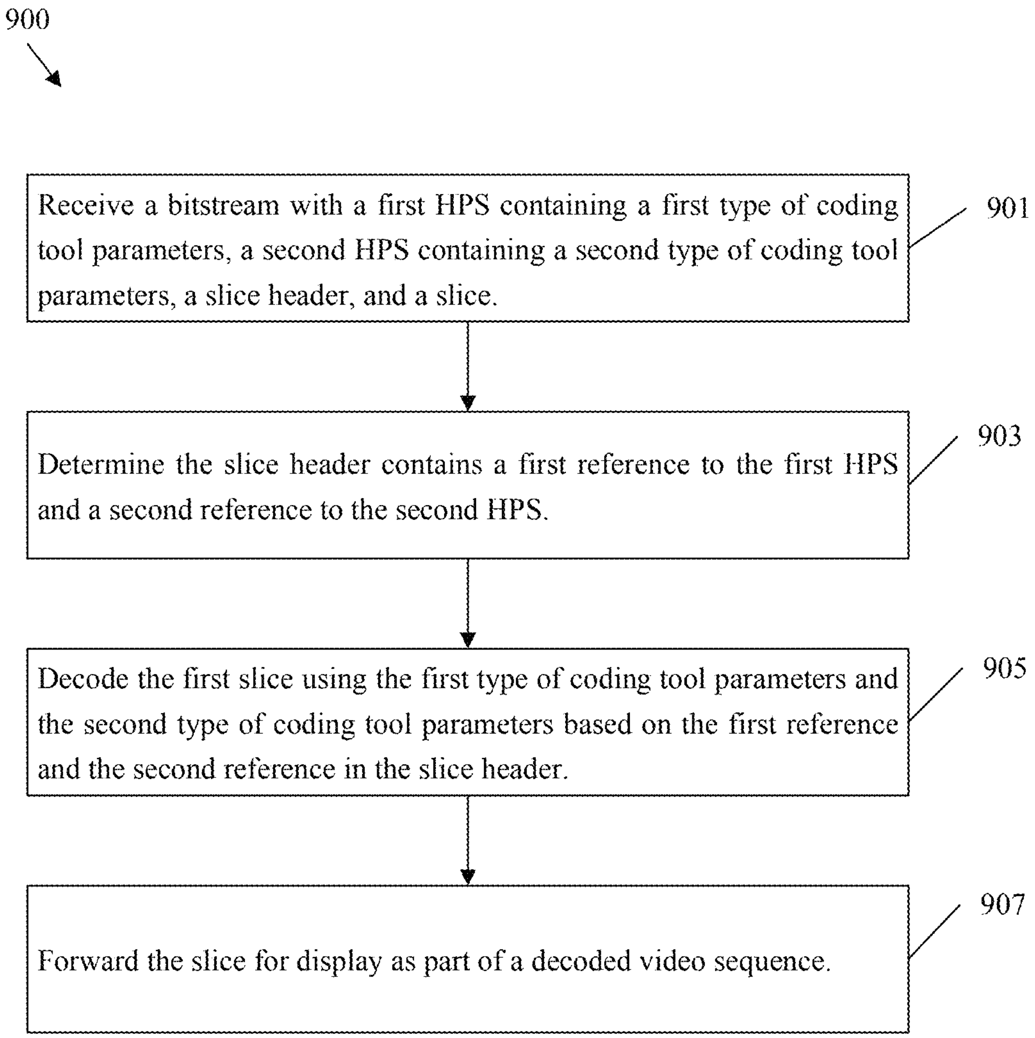
FIG. 9 is a flowchart of an example method of decoding a video sequence from a bitstream by using an HPS.

FIG. 9 is a flowchart of an example method 900 of decoding a video sequence from a bitstream, such as bitstream 500, by using an HPS. Method 900 may be employed by a decoder, such as a codec system 200, a decoder 400, and/or a video coding device 700 when performing method 100. The results of method 900 may also be employed to support temporal scaling according to mechanism 600 at a decoder. Method 900 may be employed in response to receiving a bitstream from an encoder, such as encoder 300, and hence method 900 may be employed in response to method 800

Method 900 may begin when a decoder begins receiving a bitstream of coded data representing a video sequence, for example as a result of method 800. At step 901, a bitstream is received at a decoder. The bitstream comprises a plurality of HPS including a first HPS and a second HPS. The first HPS is a first type of HPS and contains a first type of coding tool parameters. The second HPS is a second type of HPS and contains a second type of coding tool parameters. The bitstream also includes a slice header and a slice associated with the slice header.

At step 903, the decoder determines that the slice header contains a first reference to the first HPS and a second reference to the second HPS. Hence, the slice header may inherit coding tool parameters from a plurality of HPS of different types. This allows such coding tool parameters to be omitted from the slice headers and increases coding efficiency of the bitstream by reducing redundant coding tool parameter signaling. As a specific example, the first HPS and the second HPS may include an ALF HPS, a LMCS HPS, a scaling list parameters HPS, or combinations thereof.

At step 905, the decoder can decode the slice using the first type of coding tool parameters and the second type of coding tool parameters based on the determination that the slice header contains the first reference and the second reference. To reduce complexity of HPS related coding methods, the HPS may be restricted from referencing coding tool parameters stored in other HPS. Accordingly, the plurality of HPS received in the bitstream at step 901, which include the first HPS and the second HPS, is restricted from referencing coding tool parameters from other HPS in the plurality of HPS. Also, the HPS may be coded to support temporal scaling by including a temporal ID in each HPS. In one example, the first HPS is contained in an access unit associated with a temporal ID. Further, the first HPS contains the same temporal ID that is associated with the access unit that contains the first HPS. In another example, the first slice is partitioned from a first picture, and the first picture is associated with a temporal ID. In this example, the first HPS contains the temporal ID associated with the picture. Further, to support temporal scaling, each of the plurality of HPS and each of the slices are associated with one of a plurality of temporal IDs. Further, each slice with a first temporal ID is restricted from referring to any HPS with a second temporal ID that is greater (e.g., associated with a higher frame rate) than the first temporal ID. This ensures that slices associated with lower frame rates do not refer to HPS associated with higher frame rates, as such HPS are ignored when lower frame rates are employed according to temporal scaling mechanisms.

At step 907, the decoder can forward the slice for display as part of a decoded video sequence.

Figure 10:
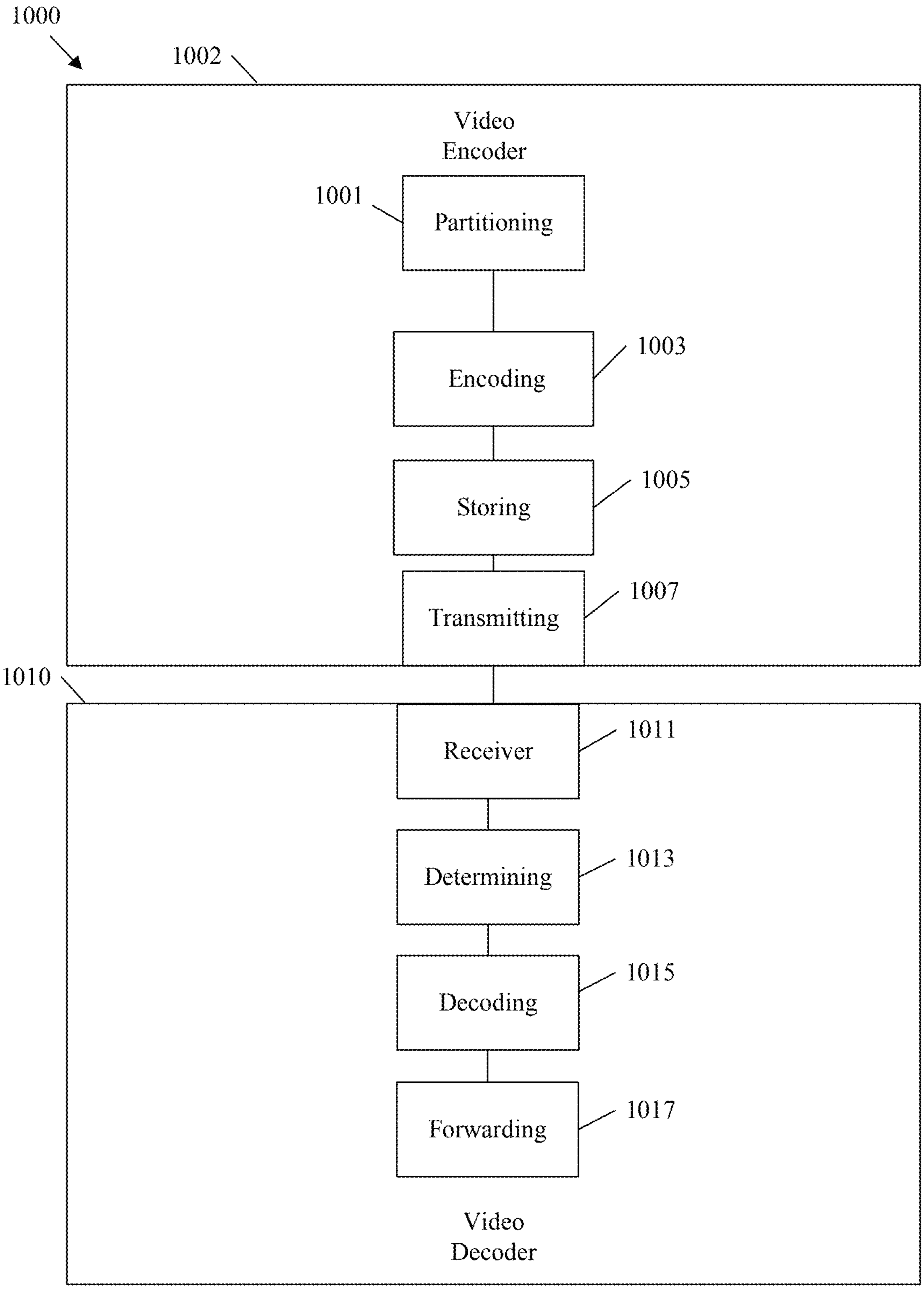
FIG. 10 is a schematic diagram of an example system for coding a video sequence of images in a bitstream by using an HPS.

FIG. 10 is a schematic diagram of an example system 1000 for coding a video sequence of images in a bitstream, such as bitstream 500, by using an HPS. System 1000 may be implemented by an encoder and a decoder such as a codec system 200, an encoder 300, a decoder 400, and/or a video coding device 700. Further, system 1000 may be employed when implementing method 100, 800, and/or 900. In addition, system 1000, may be employed to support temporal scaling as discussed with respect to mechanism 600.

The system 1000 includes a video encoder 1002. The video encoder 1002 comprises a partitioning module 1001 for partitioning a plurality of pictures into a plurality of slices. The video encoder 1002 further comprises an encoding module 1003 for encoding the plurality of slices into a bitstream, wherein the slices are encoded by at least a first type of coding tools based on a first type of coding tool parameters and a second type of coding tools based on a second type of coding tool parameters. The encoding module 1003 is further for encoding a first HPS and a second HPS into the bitstream, the first HPS containing the first type of coding tool parameters and the second HPS containing the second type of coding tool parameters. The encoding module 1003 is further for encoding a first slice header into the bitstream describing an encoding of a first slice of the plurality of slices, wherein the first slice header contains a first reference to the first HPS and a second reference to the second HPS. The video encoder 1002 further comprises a storing module 1005 for storing the bitstream for communication toward a decoder. The video encoder 1002 further comprises transmitting module 1005 for transmitting the bitstream with the first HPS and second HPS to support decoding the slices at a decoder based on the first type of coding tools and the second type of coding tools. The video encoder 1002 may be further configured to perform any of the steps of method 800.

The system 1000 also includes a video decoder 1010. The video decoder 1010 comprises a receiving module 1011 for receiving a bitstream comprising a HPS containing a first type of coding tool parameters, a second HPS containing a second type of coding tool parameters, a slice header, and a slice associated with the slice header. The video decoder 1010 further comprises a determining module 1013 for determining that the slice header contains a first reference to the first HPS and a second reference to the second HPS. The video decoder 1010 further comprises a decoding module 1015 for decoding the slice using the first type of coding tool parameters and the second type of coding tool parameters based on the determination that the slice header contains the first reference and the second reference. The video decoder 1010 further comprises a forwarding module 1017 for forwarding the slice for display as part of a decoded video sequence. The video decoder 1010 may be further configured to perform any of the steps of method 900.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method implemented by a decoder, the method comprising:

receiving a bitstream comprising a plurality of network abstraction layer (NAL) units including an adaptive loop filter (ALF) adaptation parameter set (APS) including ALF parameters, a luma mapping with chroma scaling (LMCS) APS including LMCS parameters, a scaling list APS including scaling list parameters, and a slice, wherein when a NAL unit type (nal-unit-type) for any of the NAL units is equal to prefix APS NAL unit type (PREFIX_APS_NUT) or suffix APS NAL unit type (SUFFIX_APS_NUT), a temporal identifier (TemporalId) of the NAL unit shall be greater than or equal to a TemporalId of a picture unit containing the NAL unit, wherein each APS includes only one type of APS parameter, wherein the ALF APS, the LMCS APS, and the scaling list APS cannot directly reference another APS, and wherein the ALF APS, the LMCS APS, and the scaling list APS are contained in APS NAL units;

determining a single header includes all of an ALF APS identifier (ID), an LMCS APS ID, and a scaling list APS ID referencing the ALF APS, the LMCS APS, and the scaling list APS, respectively; and decoding the slice based on the ALF parameters from the ALF APS, the LMCS parameters from the LMCS APS, and the scaling list parameters from the scaling list APS.

2. The method of claim 1, wherein the single header is a slice header.

3. The method of claim 1, wherein the APS NAL units and a picture containing the slice each comprise a TemporalId, and wherein the TemporalIds of the APS NAL units are required to be less than or equal to the TemporalId of the picture.

4. The method of claim 1, wherein a NAL unit including the slice is a video coding layer (VCL) NAL unit.

5. The method of claim 1, wherein NAL units including the ALF APS, the LMCS APS, and the scaling list APS are non-video coding layer (non-VCL) NAL units.

6. The method of claim 1, wherein the single header references the ALF APS, the LMCS APS, and the scaling list APS when at least one of a group of coding tools contained in each of the ALF APS, the LMCS APS, and the scaling list APS are enabled in the bitstream.

7. A method implemented by an encoder, the method comprising:

encoding an adaptive loop filter (ALF) adaptation parameter set (APS) including ALF parameters, a luma mapping with chroma scaling (LMCS) APS including LMCS parameters, and a scaling list APS including scaling list parameters into a bitstream, wherein the ALF APS, the LMCS APS, and the scaling list APS are included in a plurality of network abstraction layer (NAL) units, wherein when a NAL unit type (nal_unit_type) for any of the NAL units is equal to prefix APS NAL unit type (PREFIX_APS_NUT) or suffix APS NAL unit type (SUFFIX_APS_NUT), a temporal identifier (TemporalId) of the NAL unit shall be greater than or equal to a TemporalId of a picture unit containing the NAL unit, wherein each APS includes only one type of APS parameter, wherein the ALF APS, the LMCS APS, and the scaling list APS cannot directly reference another APS;

encoding a single header into the bitstream, wherein the single header includes all of an ALF APS identifier (ID), an LMCS APS ID, and a scaling list APS ID referencing the ALF APS, the LMCS APS, and the scaling list APS, respectively;

encoding a slice into a bitstream based on the ALF parameters from the ALF APS, the LMCS parameters from the LMCS APS, and the scaling list parameters from the scaling list APS; and storing the bitstream.

8. The method of claim 7, wherein the single header is a slice header.

9. The method of claim 7, wherein the APS NAL unit and a picture containing the slice each comprise a TemporalId, and wherein the TemporalId of the APS NAL unit is required to be less than or equal to the TemporalId of the picture.

10. The method of claim 7, wherein a NAL unit including the slice is a video coding layer (VCL) NAL unit.

11. The method of claim 7, wherein NAL units including the ALF APS, the LMCS APS, and the scaling list APS are non-video coding layer (non-VCL) NAL units.

12. The method of claim 7, wherein the single header references the ALF APS, the LMCS APS, and the scaling list APS when at least one of a group of coding tools contained in each of the ALF APS, the LMCS APS, and the scaling list APS are enabled in the bitstream.

13. A non-transitory computer-readable storage medium storing a bitstream and one or more instructions executable by at least one processor to perform operations of encoding of the bitstream, the operations comprising:

encoding an adaptive loop filter (ALF) adaptation parameter set (APS) including ALF parameters, a luma mapping with chroma scaling (LMCS) APS including LMCS parameters, and a scaling list APS including scaling list parameters into the bitstream, wherein the ALF APS, the LMCS APS, and the scaling list APS are included in a plurality of network abstraction layer (NAL) units, wherein when a NAL unit type (nal_unit_type) for any of the NAL units is equal to prefix APS NAL unit type (PREFIX_APS_NUT) or suffix APS NAL unit type (SUFFIX_APS_NUT), a temporal identifier (TemporalId) of the NAL unit shall be greater than or equal to a TemporalId of a picture unit containing the NAL unit, wherein each APS includes only one type of APS parameter, wherein the ALF APS, the LMCS APS, and the scaling list APS cannot directly reference another APS;

encoding a single header that includes all of an ALF APS identifier (ID), an LMCS APS ID, and a scaling list APS ID referencing the ALF APS, the LMCS APS, and the scaling list APS, respectively;

encoding a slice coded based on the ALF parameters from the ALF APS, the LMCS parameters from the LMCS APS, and the scaling list parameters from the scaling list APS; and generating the bitstream.

14. The non-transitory computer-readable storage medium of claim 13, wherein the single header is a slice header.

15. The non-transitory computer-readable storage medium of claim 13, wherein the APS NAL unit and a picture containing the slice each comprise a TemporalId, and wherein the TemporalId of the APS NAL unit is required to be less than or equal to the TemporalId of the picture.

16. The non-transitory computer-readable storage medium of claim 13, wherein a NAL unit including the slice is a video coding layer (VCL) NAL unit.

17. The non-transitory computer-readable storage medium of claim 13, wherein NAL units including the ALF APS, the LMCS APS, and the scaling list APS are non-video coding layer (non-VCL) NAL units.

18. The non-transitory computer-readable storage medium of claim 13, wherein the single header references the ALF APS, the LMCS APS, and the scaling list APS when at least one of a group of coding tools contained in each of the ALF APS, the LMCS APS, and the scaling list APS are enabled in the bitstream.

* * * * *